(12) United States Patent
Lin et al.

(10) Patent No.: US 7,668,376 B2
(45) Date of Patent: Feb. 23, 2010

(54) SHAPE FEATURE EXTRACTION AND CLASSIFICATION

(75) Inventors: Siming Lin, Austin, TX (US); Kevin M. Crotty, Austin, TX (US); Nicolas Vazquez, Austin, TX (US)

(73) Assignee: National Instruments Corporation, Austin, TX (US)

(*) Notice: Subject to any disclaimer, the term of this patent is extended or adjusted under 35 U.S.C. 154(b) by 796 days.

(21) Appl. No.: 11/003,187

(22) Filed: Dec. 3, 2004

(65) Prior Publication Data

US 2006/0008151 A1   Jan. 12, 2006

Related U.S. Application Data

(60) Provisional application No. 60/584,379, filed on Jun. 30, 2004.

(51) Int. Cl.
*G06K 9/46* (2006.01)
(52) U.S. Cl. .................. 382/190; 382/115; 345/544; 370/240.16
(58) Field of Classification Search ............... 382/190, 382/224, 133, 115, 225; 345/544; 370/240.16
See application file for complete search history.

(56) References Cited

U.S. PATENT DOCUMENTS 6,275,614 B1 * 8/2001 Krishnamurthy et al. .... 382/224
6,501,857 B1 * 12/2002 Gotsman et al. ............ 382/224
6,631,204 B1 * 10/2003 Smith ........................ 382/130
7,236,623 B2 * 6/2007 Chapoulaud et al. ........ 382/133
2003/0156762 A1 * 8/2003 August ...................... 382/260

OTHER PUBLICATIONS

Weber, et al., "Viewpoint-Invariant Learning and Detection of Human Heads", Proceedings I M. of the 4th International Conference on Automatic Face and Gesture Recognition, 2000, pp. 20-27.*

(Continued)

*Primary Examiner*—Samir A. Ahmed
*Assistant Examiner*—Aklilu K Woldemariam
(74) *Attorney, Agent, or Firm*—Meyertons Hood Kivlin Kowert & Goetzel, P.C.; Jeffrey C. Hood; Mark S. Williams

(57) ABSTRACT

System and method for analyzing an image. A received image, comprising an object or objects, is optionally preprocessed. Invariant shape features of the object(s) are extracted using a generalized invariant feature descriptor. The generalized invariant feature descriptor may comprise a generalized invariant feature vector comprising components corresponding to attributes of each object, e.g., related to circularity, elongation, perimeter-ratio-based convexity, area-ratio-based convexity, hole-perimeter-ratio, hole-area-ratio, and/or functions of Hu Moment 1 and/or Hu Moment 2. Non-invariant features, e.g., scale and reflection, may be extracted to form corresponding feature vectors. The object is classified by computing differences between the generalized invariant feature vector (and optionally, non-invariant feature vectors) and respective generalized invariant feature vectors corresponding to reference objects, determining a minimum difference corresponding to a closest reference object or class of reference objects of the plurality of reference objects, and outputting an indication of the closest reference object or class as the classification.

50 Claims, 15 Drawing Sheets

Computer System
102

OTHER PUBLICATIONS

P K Sinha, Fast Recognition on general processor using moment invariants, printed and published by IEEE, Savoy Place, London WC2R0BL, UK, 1993, pp. 1-4.*

R. C. Gonzalez and R. E. Woods, "Digital Image Processing," Addison-Wesley Publishing Company, Inc., New York, New York, 1992, pp. 502-507.

M. K. Hu, "Visual Pattern Recognition by Moment Invariants," IRE Transactions on Information Theory, vol. IT-8, Feb. 1962, pp. 179-187.

L. I. Kuncheva, J. C. Bezkek, R. P. Duin, "Decision templates for multiple classifier fusion: an experimental comparison," Pattern Recognition Society, vol. 34, 2001.

* cited by examiner

SHAPE FEATURE EXTRACTION AND CLASSIFICATION

PRIORITY DATA

The application claims benefit of priority to U.S. Provisional Application Ser. No. 60/584,379, titled "Shape Feature Extraction and Classification", filed Jun. 30, 2004, and whose inventors are Siming Lin, Kevin M. Crotty, and Nicolas Vazquez.

FIELD OF THE INVENTION

The present invention relates generally to machine vision and image processing, and more particularly to a system and method for extracting and classifying one or more objects in an image or data set.

DESCRIPTION OF THE RELATED ART

In many applications it is necessary or desired to detect and classify features in a data set, such as an object in a target image, referred to as an object of interest. Such applications include machine vision applications for manufacturing, testing, inspection, process monitoring, feedback control, and laboratory automation; and image and video compression, among others. One powerful image processing technique is called 'blob' analysis, also referred to as particle analysis. A blob (or particle) consists of image pixels connected in the sense that one can travel from any point to any other point in the blob passing only through points with the same color. Typically blobs are extracted from binarized images, but blobs can conceptually be extracted from any type of image. Preprocessing steps, such as spatial and morphologically filtering, are often used to improve blob data. Various characteristics may be used in detecting and classifying shape features in the target image, including area, topology, perimeter, and general shape characteristics, among others.

FIG. 1 is a high level functional diagram of a general image object classification application, according to the prior art. As FIG. 1 shows, initially, the image to be analyzed is acquired, represented by the image acquisition block 21. This acquisition may include a camera taking a picture and transmitting the image data to a computer system, or the computer system receiving the image from some other external system or process, such as from another computer system over a network, or any other means of image acquisition. The acquired image is typically preprocessed, as indicated by preprocessing block 23. Preprocessing typically includes noise filtering and any other desired image processing operations to prepare images for effective feature extraction. For example, in some applications, a grayscale image may be "binarized" for subsequent blob analysis, and/or filtered to remove small blobs from the image. Prior art techniques for image binarization include thresholding images to generate binary blobs, edge detection to determine image contours or boundaries, etc.

Feature extraction 25 generally transforms an input image into a feature vector in a feature space. The purpose of feature extraction is to "reduce" the input image by measuring certain features or properties that distinguish images of different classes. Generally, each extracted feature is a quantified representation of some particular attribute, such as a geometric attribute, of the image or object of interest, such as, for example, its "circularity", which may be represented as a value in a specified range, such as between zero and one. A collection of these extracted feature values (for different features) may form a vector in the applicable feature space.

Once the features have been extracted, a classification process 27 may analyze the extracted features, e.g., the features vector, and determine a most suitable class designation for the image or object of interest. Generally, the classification process partitions feature vectors in the feature space into separate classes with minimal error based on some statistical criteria. For example, the output of the classification could be "good" or "bad" parts for inspection, or a label of certain class predefined by users in identification applications such as part sorting. The output of the classification may then be used to activate certain actions in decision unit 29, for instance, to send an output to DIO to execute a motion control.

The representation of the image or object of interest for purposes of classification with respect to shape is referred to as a shape descriptor. Some important characteristics of a good shape descriptor are representativeness and robustness, where representativeness refers to the scope and uniqueness of the descriptor in describing a variety of different shapes, and where robustness refers to stability of the classification in real-world environments, i.e., sensitive to shape change but insensitive to noise.

There are many different features that have been used for different machine vision applications, for examples, degree of compactness of a shape, referred to as its form factor, topological descriptors such as Euler number, defined as the difference between the numbers of holes and connected components (see, for example, R. C. Gonzalez and R. E. Woods, Digital Image Processing, Addison-Wesley, New York, 1992), and Hu moments, which are scale- and rotation-invariant shape descriptors (see, for example, M. K. Hu, Visual Pattern Recognition by Moment Invariants, IRE Transactions on Information Theory, vol. IT-8, pp. 179-187, February 1962). While Hu moments have been proved theoretically to be a unique descriptor for shape description, these features are generally too sensitive to noise to reliably discriminate between shapes in real world applications. Additionally, there is also no effective way to normalize the Hu moments for general classification applications.

Blob or particle analysis in machine vision software usually outputs many different measurements related to shape features, and it is generally up to users to determine what features to use for a specific application.

Some popular classification algorithms for shape classification are nearest-neighbor algorithm, neural networks etc. However, the feature vector needs to be normalized for the classification algorithm to work properly. Recently, multi-classification systems have been used for many different pattern recognition tasks (see, e.g., L. I. Kuncheva, J. C. Bezkek, R. P. Duin, Decision templates for multiple classifier fusion: an experimental comparison, Pattern Recognition, vol. 34, 2001). Such multi-scheme processes are referred to as classification fusion, and usually result in better classification performance than a single classifier approach.

Prior art blob classification techniques have not provided an effective way for feature selection for a general-purpose classification tool. The scope of individual blob features and simple combinations of them is very limited. Moreover, with the different ranges of feature measurements from blob analysis, there is currently no known effective way to perform normalization in a highly non-isotropic feature space. This problem is especially acute when the amount of training samples is not large enough to perform meaningful normalization. For example, one common normalization process is defined as:

$$\overline{X} = \frac{(X-m)}{\sigma},$$

where X is the feature value, m and σ are the mean and standard deviation of the input feature set for a labeled class, respectively. Clearly, with only one training sample for a class, the deviation is zero, which makes normalization impossible.

Additionally, prior art techniques provide no effective way for feature extraction of shape reflection, which is important in some machine vision applications that need to distinguish mirror images. Similarly, scale or reflection features, such as area or reflection angle, cannot be directly integrated with other, invariant, features such as circularity or elongation factor to form a feature vector for scale or reflection dependent shape classification. For example, using Euclidean distance in a nearest neighbor classifier, the distance of areas of different objects will usually overweight other features and make the classification too sensitive to area variation.

SUMMARY OF THE INVENTION

One embodiment of the present invention comprises a system and method for analyzing images based on feature extraction and classification using a substantially generalized invariant shape descriptor that facilitates characterization and/or discrimination of substantially any blob (i.e., a suitable image object) with substantially any shape based on a specified set of invariant shape features. Note that as used herein, "invariant" refers to invariance with respect to scale, translation, rotation and symmetry.

An image may be received, where the image includes an object. In a preferred embodiment, the object is a blob. In one embodiment, the received image is a binary image, although in other embodiments, the image may be any type of image or data set. In one embodiment, either prior to or after said receiving, the image may be preprocessed. For example, various filters or other operations may be applied to the image data to make subsequent processing of the image more effective or easier. As one example, in an embodiment where the received image is a multi-scale image, such as a gray-scale image, the preprocessing may include binarization of the image, where a thresholding operation converts the multi-scale image to a binary image. As another example, edge detection may be performed on the image to determine a contour or boundary of the object, from which the features maybe extracted. Similar analyses, e.g., for blob determination, may be based on other image attributes such as texture, color, etc. As other examples, filters may be applied to remove noise, to remove objects smaller than some specified size, to remove all but the largest object, and so forth. It should be noted that in some embodiments there may be a plurality of objects comprised in the image, and that the techniques described herein maybe performed multiple times to analyze and classify the objects, e.g., in parallel and/or iteratively.

Invariant shape features may be extracted from the image using a generalized invariant shape feature descriptor. In other words, the object comprised in the received image may be analyzed and various features determined or computed, where the features comprise components of the generalized invariant feature descriptor. More specifically, the determined or extracted features are represented or codified as a generalized invariant feature vector in an invariant feature space. The invariant features represented by the generalized feature vector may relate to various categories, such as, for example, roundness of the object, compactness of the object, holes of the object, and Hu Moments of the object. In a preferred embodiment, the invariant features or components comprising the generalized invariant feature descriptor include respective components corresponding to: circularity of the object, elongation of the object, perimeter-ratio-based convexity of the object, area-ratio-based convexity of the object, hole-perimeter-ratio of the object, hole-area-ratio of the object, a function of Hu Moment 1 of the object, and a function of Hu Moment 2 of the object. As noted above, this feature set comprises components of a substantially generalized invariant shape descriptor that facilitates characterization and/or discrimination of substantially any object with substantially any shape.

These invariant shape features may provide a scale, translation, rotation and symmetry invariant feature set that may be used to generate the generalized invariant shape feature descriptor. Values for each of the invariant features may be computed for the object, and used as respective components of the generalized invariant feature vector for the object (i.e., the generalized invariant shape feature descriptor). Thus, extracting invariant shape features using a generalized invariant feature descriptor may include determining values for the respective components of the generalized invariant feature descriptor, thereby generating the generalized invariant feature vector corresponding to the object.

The object may then be classified based on the extracted invariant shape features, i.e., based on the generalized invariant feature descriptor for the object. In typical feature extraction and classification applications, the features of the classes or reference objects (i.e., symbols) may be pre-calculated and stored in the computer, and so the actual reference object images are not required to be stored or used for subsequent feature extraction and classification operations with respective target images. Thus, when the object of interest is analyzed, the feature information of the object, in this case represented by the invariant feature vector (the generalized invariant shape feature descriptor for the object), may be compared with the pre-computed feature information of the various classes or reference objects, in this case represented by a corresponding plurality of generalized invariant feature vectors for the reference objects, e.g., stored in one or more class files. The process of creating representations of different labeled classes based on the characterization of reference objects as feature descriptors is referred to as training for the classification system.

In a preferred embodiment, classifying the object based on the extracted invariant shape features may include computing a plurality of differences between the generalized invariant feature vector and respective generalized invariant feature vectors corresponding to a plurality of reference objects, or classes of reference objects (where, for example, each respective generalized invariant feature vector comprises an average of generalized invariant feature vectors for a respective one or more reference objects), determining a minimum difference from the plurality of differences, where the minimum difference corresponds to a closest reference object of the plurality of reference objects or a closest class of reference objects, and outputting an indication of the closest reference object or class of reference objects (e.g., the reference object class) as a classification of the object. In one embodiment, the computed differences may be considered respective distances between the feature vectors in the feature space defined by the feature set, and in a general sense may be referred to as distances between the object of interest and the reference objects (or classes), described in detail above.

In one embodiment, the generalized invariant shape feature descriptor may be used in combination with other feature descriptors, such as, for example, scale- and/or reflection-dependent feature descriptors. For example, a weighted parallel object classification scheme may be used in which a plurality of feature descriptors are used to classify an object of interest, e.g., in a serial computation, or in a distributed computation system, where the classifiers are executed in parallel. It should be noted that the term "parallel classification" refers to the use of multiple feature sets or descriptors to characterize or classify an image object, e.g., the generalized invariant and non-invariant feature descriptors or vectors described herein, and that such a feature extraction and classification process may be implemented serially or in parallel, execution-wise.

Thus, various embodiments of the present method may use the generalized invariant shape feature descriptor to characterize an object of interest (or a plurality of objects of interest) in an image or other data set, and may further use the generalized invariant shape feature descriptor, e.g., in the form of a feature vector, to classify the object (or objects), optionally in combination with other, e.g., non-invariant, feature descriptors or feature sets, such as, for example, scale and reflection features.

After the feature extraction and classification has been performed, the results may be output, for example, to a memory store on the computer, to a display screen, and/or to an external system coupled to the computer, such as a server computer system. In one embodiment, the results may be used to trigger an action. For example, in a machine vision system, the results may indicate a part that belongs to a predefined class, e.g., a "bad" part which fails a quality assurance test, and the part may be rejected, or, as another example, the results may indicate a part in an assembly line that needs to be installed in a specified position in a pick-and-place robot system.

BRIEF DESCRIPTION OF THE DRAWINGS

A better understanding of the present invention can be obtained when the following detailed description of the preferred embodiment is considered in conjunction with the following drawings, in which.

Figure 1:
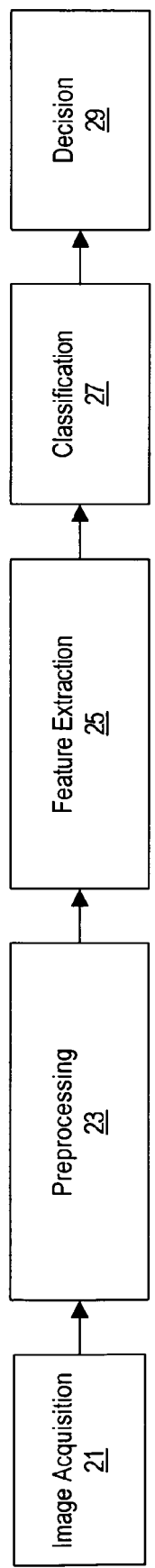
FIG. 1 is a functional diagram of a general image classification application, according to the prior art.

While the invention is susceptible to various modifications and alternative forms specific embodiments are shown by way of example in the drawings and are herein described in detail. It should be understood, however, that drawings and detailed description thereto are not intended to limit the invention to the particular form disclosed. But on the contrary the invention is to cover all modifications, equivalents and alternatives falling within the spirit and scope of the present invention as defined by the appended claims.

DETAILED DESCRIPTION OF THE EMBODIMENTS

Incorporation by Reference

The following references are hereby incorporated by reference in their entirety as though fully and completely set forth herein:

U.S. Pat. No. 4,914,568 titled "Graphical System for Modeling a Process and Associated Method," issued on Apr. 3, 1990.

U.S. Pat. No. 5,481,741 titled "Method and Apparatus for Providing Attribute Nodes in a Graphical Data Flow Environment".

The National Instruments IMAQ™ IMAQ Vision Concepts Manual, August 2004 Edition.

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as signals such as electrical, electromagnetic, or digital signals, conveyed via a communication medium such as a bus, network and/or a wireless link.

Programmable Hardware Element—includes various types of programmable hardware, reconfigurable hardware, programmable logic, or field-programmable devices (FPDs), such as one or more FPGAs (Field Programmable Gate Arrays), or one or more PLDs (Programmable Logic Devices), such as one or more Simple PLDs (SPLDs) or one or more Complex PLDs (CPLDs), or other types of programmable hardware. A programmable hardware element may also be referred to as "reconfigurable logic".

Medium—includes one or more of a memory medium, carrier medium, and/or programmable hardware element; encompasses various types of mediums that can either store program instructions/data structures or can be configured with a hardware configuration program. For example, a medium that is "configured to perform a function or implement a software object" may be 1) a memory medium or carrier medium that stores program instructions, such that the program instructions are executable by a processor to perform the function or implement the software object; 2) a medium carrying signals that are involved with performing the function or implementing the software object; and/or 3) a programmable hardware element configured with a hardware configuration program to perform the function or implement the software object.

Program—the term "program" is intended to have the full breadth of its ordinary meaning. The term "program" includes 1) a software program which may be stored in a memory and is executable by a processor or 2) a hardware configuration program useable for configuring a programmable hardware element.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, Pascal, Fortran, Cobol, Java, assembly language, etc.; graphical programs (programs written in graphical programming languages); assembly language programs; programs that have been compiled to machine language; scripts; and other types of executable software. A software program may comprise two or more software programs that interoperate in some manner.

Hardware Configuration Program—a program, e.g., a netlist or bit file, that can be used to program or configure a programmable hardware element.

Graphical Program—A program comprising a plurality of interconnected nodes or icons, wherein the plurality of interconnected nodes or icons visually indicate functionality of the program.

The following provides examples of various aspects of graphical programs. The following examples and discussion are not intended to limit the above definition of graphical program, but rather provide examples of what the term "graphical program" encompasses:

The nodes in a graphical program may be connected in one or more of a data flow, control flow, and/or execution flow format. The nodes may also be connected in a "signal flow" format, which is a subset of data flow.

Exemplary graphical program development environments which may be used to create graphical programs include LabVIEW, DasyLab, DiaDem and Matrixx/SystemBuild from National Instruments, Simulink from the MathWorks, VEE from Agilent, WiT from Coreco, Vision Program Manager from PPT Vision, SoftWIRE from Measurement Computing, Sanscript from Northwoods Software, Khoros from Khoral Research, SnapMaster from HEM Data, VisSim from Visual Solutions, ObjectBench by SES (Scientific and Engineering Software), and VisiDAQ from Advantech, among others.

The term "graphical program" includes models or block diagrams created in graphical modeling environments, wherein the model or block diagram comprises interconnected nodes or icons that visually indicate operation of the model or block diagram; exemplary graphical modeling environments include Simulink, SystemBuild, VisSim, Hypersignal Block Diagram, etc.

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as from a device, unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected nodes are often referred to as the block diagram portion of the graphical program.

Node—In the context of a graphical program, an element that may be included in a graphical program. A node may have an associated icon that represents the node in the graphical program, as well as underlying code or data that implements functionality of the node. Exemplary nodes include function nodes, terminal nodes, structure nodes, etc. Nodes may be connected together in a graphical program by connection icons or wires.

Data Flow Graphical Program (or Data Flow Diagram)—A graphical program or diagram comprising a plurality of interconnected nodes, wherein the connections between the nodes indicate that data produced by one node is used by another node.

Graphical User Interface—this term is intended to have the full breadth of its ordinary meaning. The term "Graphical User Interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window having one or more GUI Elements, or may comprise a plurality of individual GUI Elements (or individual windows each having one or more GUI Elements), wherein the individual GUI Elements or windows may optionally be tiled together.

A GUI may be associated with a graphical program. In this instance, various mechanisms may be used to connect GUI Elements in the GUI with nodes in the graphical program. For example, when Input Controls and Output Indicators are created in the GUI, corresponding nodes (e.g., terminals) may be automatically created in the graphical program or block diagram. Alternatively, the user can place terminal nodes in the block diagram which may cause the display of corresponding GUI Elements front panel objects in the GUI, either at edit time or later at run time. As another example, the GUI may comprise GUI Elements embedded in the block diagram portion of the graphical program.

Front Panel—A Graphical User Interface that includes input controls and output indicators, and which enables a user to interactively control or manipulate the input being provided to a program, and view output of the program, while the program is executing.

A front panel is a type of GUI. A front panel may be associated with a graphical program as described above.

In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators.

Graphical User Interface Element—an element of a graphical user interface, such as for providing input or displaying output. Exemplary graphical user interface elements comprise input controls and output indicators Input Control—a graphical user interface element for providing user input to a program. Exemplary input controls comprise dials, knobs, sliders, input text boxes, etc.

Output Indicator—a graphical user interface element for displaying output from a program. Exemplary output indicators include charts, graphs, gauges, output text boxes, numeric displays, etc. An output indicator is sometimes referred to as an "output control".

Processor—any of various types of computing or processing elements operable to execute program instructions, including a CPU (central processing unit), DSP (digital signal processor), programmable hardware element, e.g., an FPGA (field programmable gate array), or combinations of these elements.

Computer System—any of various types of computing or processing systems, including a personal computer system (PC), mainframe computer system, workstation, network appliance, Internet appliance, personal digital assistant (PDA), television system, grid computing system, smart camera, smart sensor, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are operable to acquire and/or store data. A measurement device may also optionally be further operable to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further operable to perform control functions, e.g., in response to analysis of the acquired or stored data. For example, the measurement device may send a control signal to an external system, such as a motion control system or to a sensor, in response to particular data. A measurement device may also be operable to perform automation functions, i.e., may receive and analyze data, and issue automation control signals in response.

Blob—an object in an image or other data set characterized by contiguous data elements, e.g., pixels, with a common value of a property, e.g., color, within a specified tolerance. Note that a blob may also include one or more holes, may have an irregular border, and may include convex and/or non-convex portions.

Figure 2A:
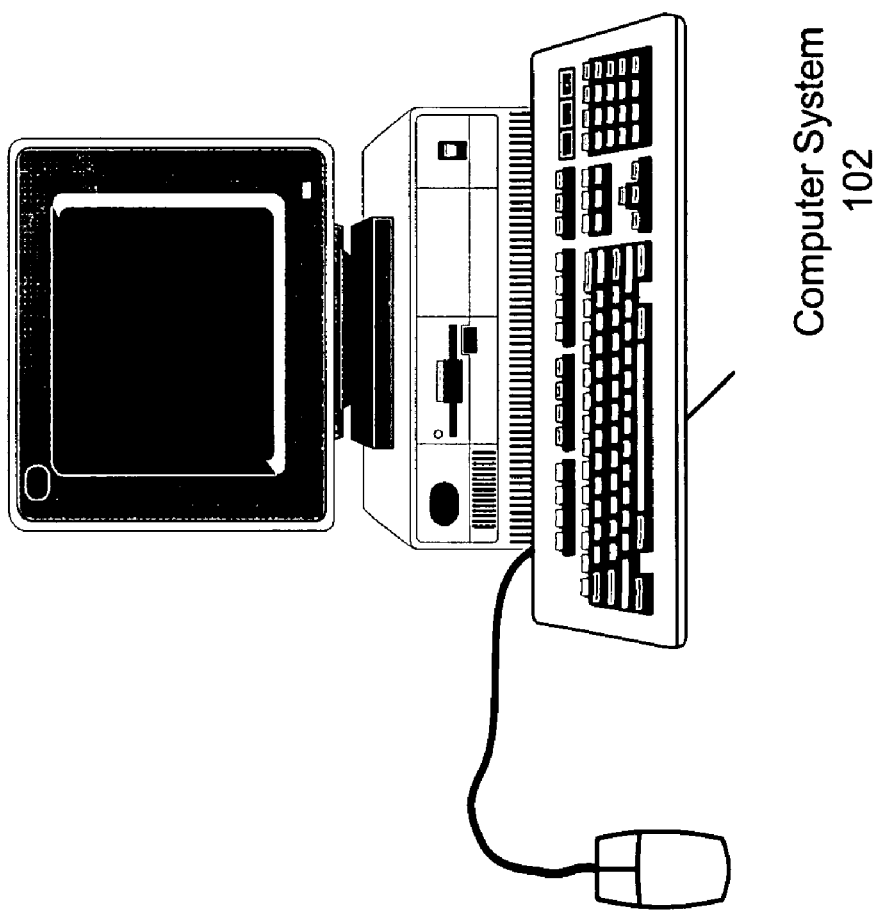
FIGS. 2A and 2B illustrate computer systems suitable for performing feature extraction and classification, according to various embodiments of the present invention.
Figure 2B:
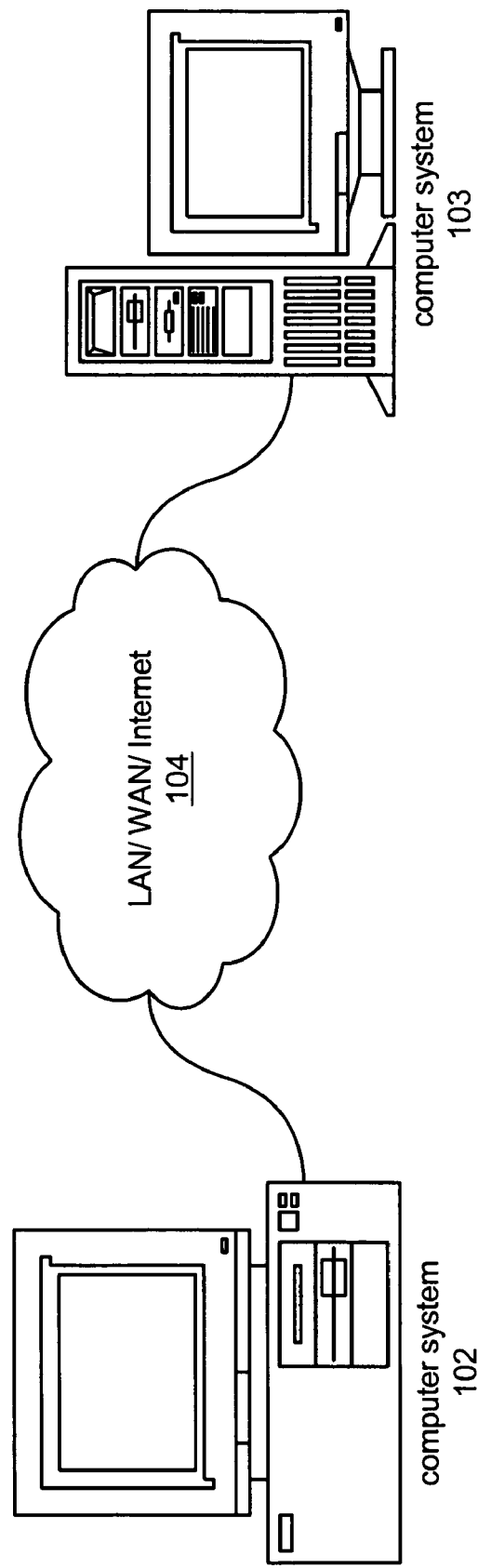

FIGS. 2A and 2B—Computer Systems

FIG. 2A illustrates a computer system 102 which may be suitable to perform feature extraction and classification, according to one embodiment of the present invention. The computer system 102 may comprise one or more processors, a memory medium, display, and an input device or mechanism, such as a keyboard or mouse, and any other components necessary for a computer system.

The computer system 102 may perform a feature extraction method on an acquired image and may use information determined in this analysis to classify the image, or an image object comprised in the image. Images that are to be classified are preferably stored in the computer memory and/or received by the computer from an external device.

The computer system 102 preferably includes one or more software programs operable to perform the feature extraction and classification. The software programs may be stored in a memory medium of the computer system 102. The term "memory medium" is intended to include various types of memory, including an installation medium, e.g., a CD-ROM, or floppy disks 104, a computer system memory such as DRAM, SRAM, EDO RAM, Rambus RAM, etc., or a non-volatile memory such as a magnetic medium, e.g., a hard drive, or optical storage. The memory medium may comprise other types of memory as well, or combinations thereof.

In addition, the memory medium may be located in a first computer in which the programs are executed, or may be located in a second different computer 103 which connects to the first computer 102 over a network 104, as illustrated in FIG. 2B. In the latter instance, the second computer may provide the program instructions to the first computer for execution. The computer systems 102 and 103 may each be any of various types, as desired. The network 104 can also be any of various types, including a LAN (local area network), WAN (wide area network), the Internet, or an Intranet, among others. In some embodiments, the computer systems 102 and 103 may execute programs according to the present invention in a distributed fashion.

Various embodiments further include receiving or storing instructions and/or data implemented in accordance with the foregoing description upon a carrier medium. Suitable carrier media include a memory medium as described above, as well as signals such as electrical, electromagnetic, or digital signals, conveyed via a communication medium such as networks and/or a wireless link.

Also, the computer system 102 may take various forms, including a personal computer system, mainframe computer system, workstation, network appliance, Internet appliance, personal digital assistant (PDA), television system, smart camera, smart sensor, or other device. In general, the term "computer system" can be broadly defined to encompass any device having a processor that executes instructions from a memory medium.

The software program(s) may be implemented in any of various ways, including procedure-based techniques, component-based techniques, graphical programming techniques, and/or object-oriented techniques, among others. For example, the software program may be implemented using ActiveX controls, C++ objects, Java Beans, Microsoft Foundation Classes (MFC), National Instruments Corporation's LabVIEW graphical programming system, or other technologies or methodologies, as desired. A processor or CPU, such as the host CPU, executing code and data from the memory medium comprises a means for performing feature extraction and classification according to the methods or flowcharts described below.

Figure 3:
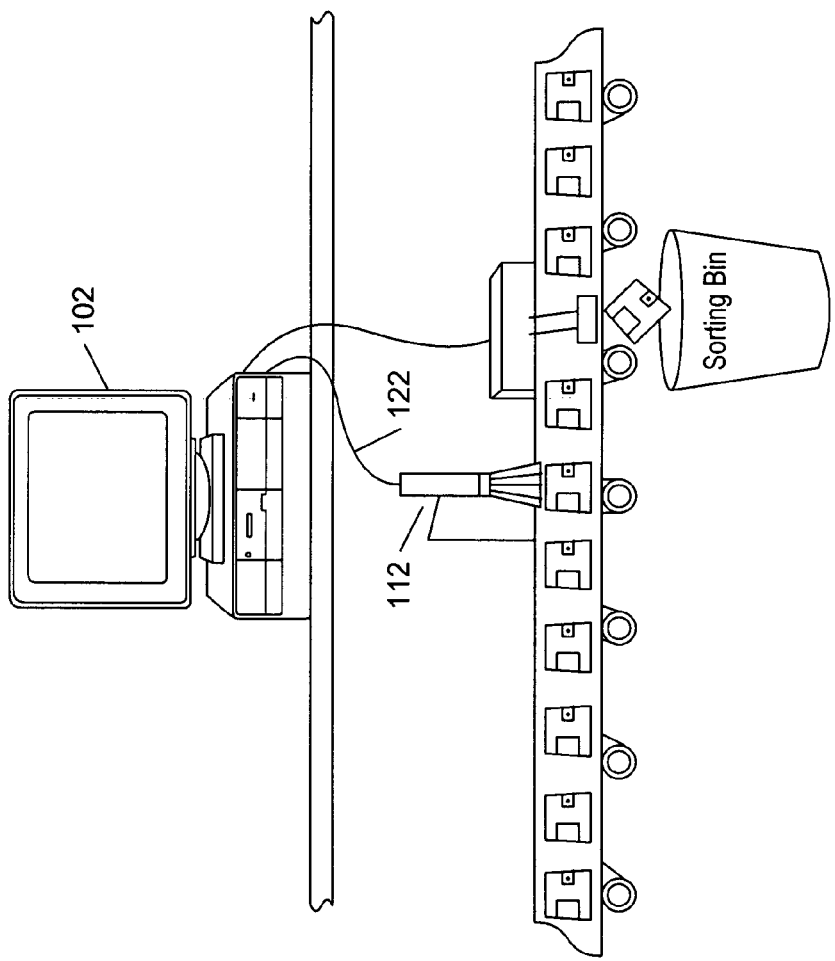
FIG. 3 illustrates an image acquisition/analysis system for acquiring and analyzing images.

FIG. 3—Machine Vision System

FIG. 3 illustrates a machine vision system or image acquisition/analysis system, which is an example of one application of the present invention. The feature extraction and classification techniques described herein may be used in various types of machine vision or motion control applications. For example, the computer 102 may be embodied in various form factors and/or architectures, e.g., a robot or embedded device, a smart camera, etc., among others. It is also noted that the feature extraction and classification techniques described herein may be performed in any of various manners, either in software, programmable logic, or hardware, or a combination thereof.

In the machine vision system of FIG. 3, computer system 102 is coupled to a camera 112 and operates to receive one or more images. The computer system 102 may be operable to perform a feature extraction method to determine one or more features of the image, and to classify the image, or an image object contained therein, based on the extracted features. In the present application, the term "image" is used to refer to either an entire image, or a portion of an image, e.g., a region of interest (ROI). The computer system 102 may also store and execute software that is operable to make a decision based on the classification, e.g., a decision to initiate an action, such as performing a motion control operation, e.g., placing the classified part into a sorting bin as shown, logging results, activating an alarm, and so forth. Of course, in other embodiments, the image data may be received from an external system or process, e.g., over a network, such as the Internet.

Figure 4:
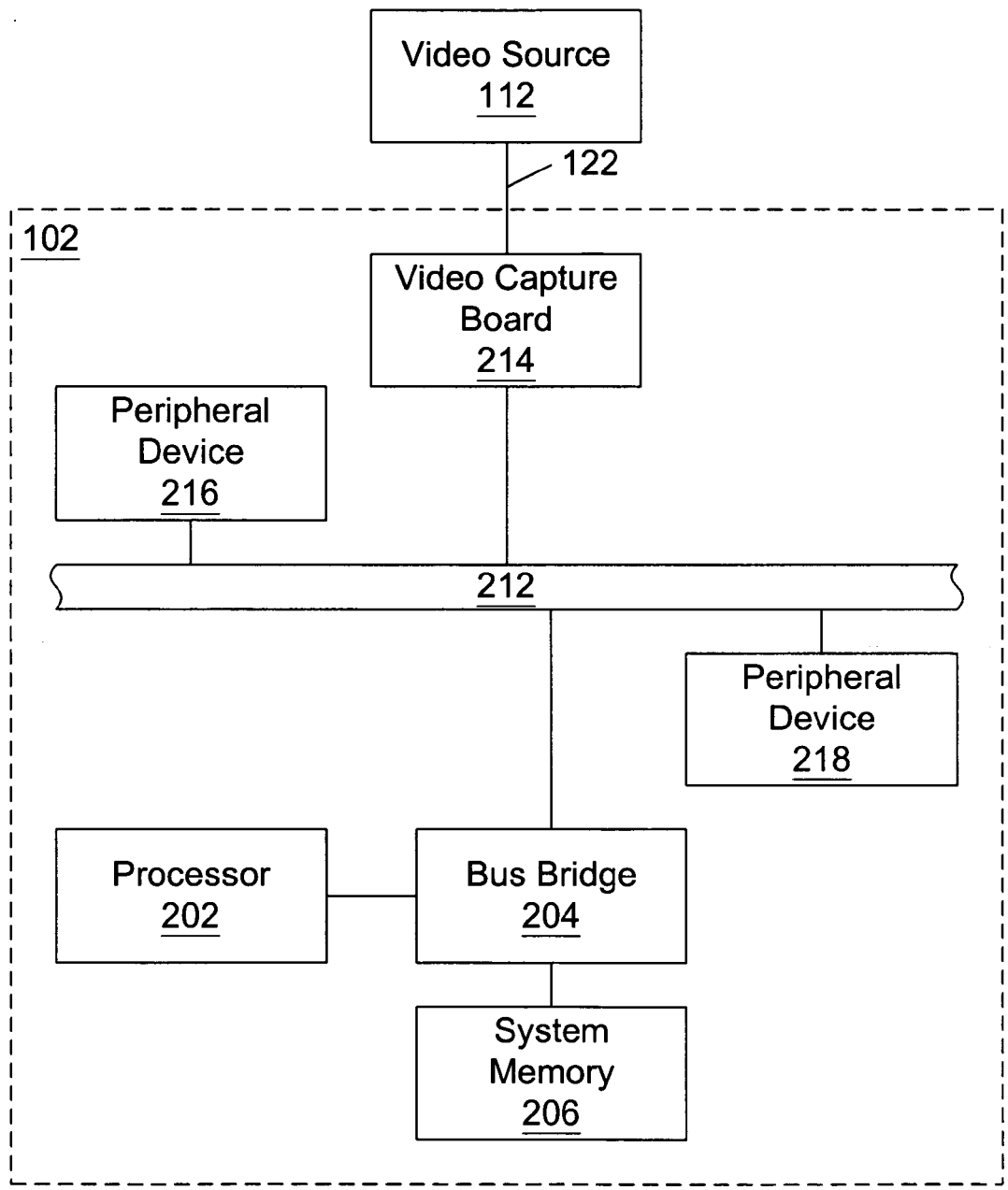
FIG. 4 is a high-level block diagram of the image acquisition/analysis system of FIG. 3, according to one embodiment.

FIG. 4—Image Acquisition System Block Diagram

FIG. 4 is a high-level block diagram of the image acquisition/analysis system of FIG. 3 for acquiring an image for shape classification according to one embodiment of the present invention. It is noted that the block diagram of FIG. 4 is exemplary only, and other computer system architectures may be used as desired. For example, the present invention may be implemented in a "smart camera", which integrates a sensor, analog to digital (A/D) converter, processor, e.g., a CPU or FPGA, and communications devices together in a single unit. The present invention may be embodied in other architectures, devices, or embodiments, as desired.

As shown in FIG. 4, the host computer 102 preferably comprises a processor 202, a bus bridge 204, system memory 206, and a peripheral bus 212. The processor 202 is coupled to the bus bridge 204. The bus bridge 204 is coupled to the system memory 206 and the processor 202, and couples to the peripheral bus 212. In the preferred embodiment, the peripheral bus 212 is the PCI expansion bus, although other types of buses may be used.

In this embodiment, the host computer system 102 also includes a video capture board 214 which is adapted for coupling to the video source 112. The video capture board 214 is preferably coupled to the peripheral bus 212. In addition to the video capture board 214, other peripheral devices (216 and 218) may be coupled to the peripheral bus 212, such as audio cards, modems, graphics cards, network cards, etc.

The video source 112 supplies the analog or digital video signals to the video capture board 214. The video capture board 214 transfers digitized video frames to the system memory 206 through peripheral bus 212 and bus bridge 204. In this embodiment, the video capture board 214 acquires the target image and transfers it to system memory 206. One or more regions of interest (ROI) may be specified in the target image which are desired to be searched for regions having a feature set that matches the feature set of a specified class, or the entire target image may be searched.

The system memory 206 may store a class file or equivalent that comprises representations of one or more classes used to classify the target image, where each class corresponds to a reference object, referred to as a symbol. In some cases, a class or reference object may actually be an average computed from a plurality of similar reference objects, or, an average of a plurality of reference objects may be treated computationally as a reference class. The class file is described in more detail below. The system memory 206 may also receive and/or store one or more other images, such as selected regions of interest (ROIs) in acquired target images. The system memory 206 also preferably stores software according to the present invention which operates to analyze the features of the target images. The software may also be executable to perform various feature extraction and classification methods, as described below.

The term "image," as used herein, may refer to any of various types of images. An image may be obtained from any of various sources, including a memory medium. An image may, for example, be obtained from an image file, such as a BMP, TIFF, AIPD, PNG, JPG, or GIF file, or a file formatted according to another image format. An image may also be obtained from other sources, including a hardware device, such as a camera, framegrabber, scanner, etc. An image may be a complex image, in which pixel values (positions) have a real part and an imaginary part.

It is noted that, in a feature extraction and classification application, the features of the classes or reference objects (also referred to as symbols) may be pre-calculated and stored in the computer, and so the actual reference object images are not required to be stored or used for subsequent feature extraction and classification operations with respective target images. Thus, when a target image is acquired, the software may compare the feature information of the target image with the pre-computed feature information of the various classes in the class file.

The present invention is preferably implemented in one or more software programs that are executable by a processor or CPU. The software program(s) of the present invention are preferably stored in a memory medium of a computer as described above.

Figure 5:
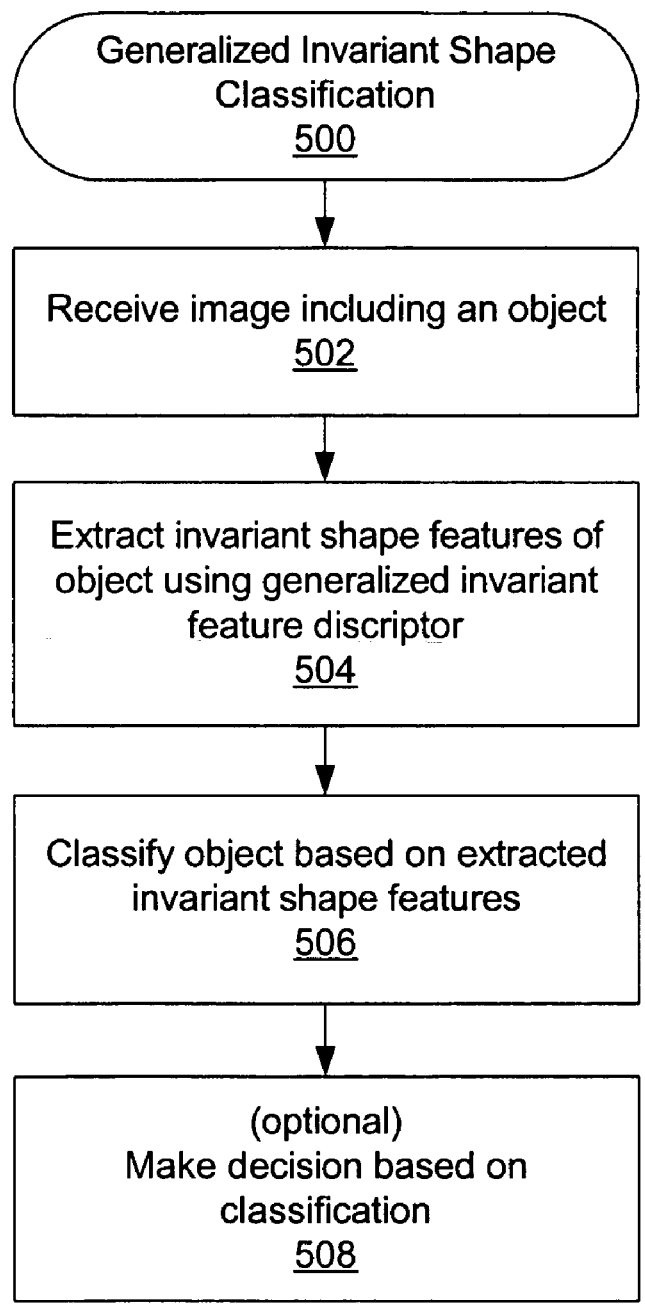
FIG. 5 is a flowchart diagram illustrating one embodiment of a method for feature extraction and classification of an object using a generalized invariant shape feature descriptor.

FIG. 5—Invariant Shape Feature Extraction and Classification

FIG. 5 is a high-level flowchart of one embodiment of a method for invariant feature extraction and classification. More specifically, the feature extraction and classification method of FIG. 5 uses a substantially generalized invariant shape descriptor that facilitates characterization and/or discrimination of substantially any blob (i.e., a suitable image object) with substantially any shape based on a specified set of invariant shape features, described in detail below. It should be noted that in the various methods described herein, some of the method elements described may be performed concurrently, in a different order than shown, or omitted. Additional method elements may also be performed as desired.

As FIG. 5 shows, in 502, an image may be received, where the image includes an object. In a preferred embodiment, the object is a blob. In various embodiments, the image may be received from any of a variety of sources. For example, the image (i.e., image data) may simply be retrieved from memory, e.g., of the computer 102 itself, or from a memory medium of another computer 103 coupled to the computer 102, e.g., a server computer. In other embodiments, the computer 102 may be coupled to, or included in, a machine vision system, such as that described above with reference to FIGS.

3 and 4, and so the image may be received from a camera, or other image acquisition device. In one embodiment, the received image is a binary image, although in other embodiments, the image may be any type of image or data set.

In one embodiment, either prior to or after said receiving, the image may be preprocessed. For example, various filters or other operations may be applied to the image data to make subsequent processing of the image more effective or easier. As one example, in an embodiment where the received image is a multi-scale image, such as a gray-scale image, the pre-processing may include binarization of the image, where a thresholding operation converts the multi-scale image to a binary image. As another example, edge detection may be performed on the image to determine a contour or boundary of the object, from which the features maybe extracted. Similar analyses, e.g., for blob determination, may be based on other image attributes such as texture, color, etc. As other examples, filters may be applied to remove noise, to remove objects smaller than some specified size, to remove all but the largest object, and so forth.

It should be noted that in some embodiments there may be a plurality of objects comprised in the image, and that the techniques described herein maybe performed multiple times to analyze and classify the objects, e.g., in parallel and/or iteratively.

In 504, invariant shape features may be extracted from the image using a generalized invariant shape feature descriptor. In other words, the object comprised in the received image may be analyzed and various features determined or computed, where the features comprise components of the generalized invariant feature descriptor. More specifically, the determined or extracted features are represented or codified as a generalized invariant feature vector in an invariant feature space. Note that as used herein, "invariant" refers to invariance with respect to scale, translation, rotation and symmetry. The invariant features represented by the generalized feature vector may relate to various categories, such as, for example, roundness of the object, compactness of the object, holes of the object, and Hu Moments of the object. In a preferred embodiment, the invariant features or components comprising the generalized invariant feature descriptor include respective components corresponding to: circularity of the object, elongation of the object, perimeter-ratio-based convexity of the object, area-ratio-based convexity of the object, hole-perimeter-ratio of the object, hole-area-ratio of the object, a function of Hu Moment 1 of the object, and a function of Hu Moment 2 of the object. As noted above, this feature set comprises components of a substantially generalized invariant shape descriptor that facilitates characterization and/or discrimination of substantially any object with substantially any shape.

In one embodiment, the component corresponding to the circularity of the object comprises the reciprocal of the circularity of the object, and is referred to as F1 (Feature 1). In one embodiment, the reciprocal of the circularity of the object may be computed thusly:

$$F1 = \frac{2\sqrt{\pi A}}{P}$$

where A is the area of the object, and P is the perimeter of the object. This feature, also called the "form factor" of the object, thus describes the circularity of the object. For example, the less circular the shape is, the lower its score for this feature. In an embodiment where F1 ranges from 0 to 1, a circular disk's score for this feature is 1.

In one embodiment, the component corresponding to the elongation of the object comprises a normalized reciprocal of the elongation of the object, and is referred to as F2 (Feature 2). In one embodiment, the reciprocal of the elongation of the object may be computed thusly:

$$F2 = \frac{4A_{CH}}{\pi F^2}$$

where $A_{CH}$ is the area of the convex hull of the object, and F is the maximum Feret diameter. As is well known in the art, the maximum Feret diameter refers to the maximum separation between a pair of parallel lines that just enclose the object of interest. Said another way, the maximum Feret diameter of an object is the maximum straight-line point-to-point distance between points on the perimeter of the object. This feature (F2) thus describes or represents the degree of elongation of the object.

In one embodiment, the component corresponding to the perimeter ratio based convexity of the object, referred to as F3 (Feature 3), may be computed thusly:

$$F3 = \frac{P_{CH}}{P}$$

where $P_{CH}$ is the convex hull perimeter and P is the perimeter of the object.

In one embodiment, the component corresponding to the area ratio based convexity of the object, referred to as F4 (Feature 4), may be computed thusly:

$$F4 = \frac{A}{A_{CH}}$$

where $A_{CH}$ is the area of the convex hull of the object and A is the area of the object. This feature is closely related to Feature 3 but may be considered a more detailed description of the convexity of the object shape.

In one embodiment, the component corresponding to the hole perimeter ratio, referred to as F5 (Feature 5), may be computed thusly:

$$F5 = P/(P + P_H)$$

where P is the perimeter and $P_H$ is the sum of hole perimeters of the object. This feature may be used for discrimination of objects with holes.

In one embodiment, the component corresponding to the hole area ratio of the object, referred to as F6 (Feature 6), may be computed thusly:

$$F6 = A/(A + A_H)$$

where A is the area and $A_H$ is the sum of hole areas of the object. This feature is closely related to Feature 5, and may be used for further discrimination of objects with holes.

In one embodiment, the component corresponding to a function of Hu Moment 1 of the object, referred to as F7 (Feature 7), may simply be the Hu Moment 1 itself, and may be computed thusly:

$$F7 = Hu\ Moment\ 1 = \eta_{20} + \eta_{02}$$

where $\eta_{20}$ and $\eta_{02}$ are normalized second order central moments of the object, as is well known in the art. The feature describes or represents the spread of the object shape.

In one embodiment, the component corresponding to a function of Hu Moment 2 of the object, referred to as F8 (Feature 8), may be computed thusly:

$$F8 = Hu\ Moment\ 2 = \sqrt{(\eta_{20} - \eta_{20})^2 + 4\eta_{11}^2},$$

where $\eta_{20}$, $\eta_{02}$ and $\eta_{11}$ are the normalized second order central moments of the object. This feature may describe or represent the slenderness of the shape.

As mentioned above, these invariant shape features may provide a scale, translation, rotation and symmetry invariant feature set that may be used to generate the generalized invariant shape feature descriptor. For example, in one embodiment, values for each of the above features (F1-F8) may be computed for the object, and used as respective components of the generalized invariant feature vector for the object (i.e., the generalized invariant shape feature descriptor). Thus, in one embodiment, extracting invariant shape features using a generalized invariant feature descriptor may include determining values for the respective components of the generalized invariant feature descriptor, thereby generating the generalized invariant feature vector corresponding to the object.

In one embodiment, the value for each of the respective components may be inherently within, or normalized to, a specified range. For example, in a preferred embodiment, the specified range for each value may be approximately zero to approximately one, although it should be noted that any other range may also be used as desired. Note that Features 1-6 above have values that are inherently between zero and one (inclusive), i.e., in the interval [0,1], and thus, no normalization step may be required. Regarding Features 7 and 8, the components using the two Hu Moments may be non-linearly normalized into the interval [0,1]

As indicated in 506, the object may then be classified based on the extracted invariant shape features, i.e., based on the generalized invariant feature descriptor for the object. As noted above, in one embodiment, the generalized invariant feature descriptor comprises a generalized invariant feature vector comprising respective components corresponding to the extracted invariant shape features.

As described above, in typical feature extraction and classification applications, the features of the classes or reference objects (i.e., symbols) may be pre-calculated and stored in the computer, and so the actual reference object images are not required to be stored or used for subsequent feature extraction and classification operations with respective target images. Thus, when the object of interest is analyzed, the feature information of the object, in this case represented by the generalized invariant feature vector (the generalized invariant shape feature descriptor for the object), may be compared with the pre-computed feature information of the various classes or reference objects, in this case represented by a corresponding plurality of generalized invariant feature vectors for the reference objects or classes, e.g., stored in one or more class files. For example, in the case that classes or represented, each respective generalized invariant feature vector may comprise an average of generalized invariant feature vectors for a respective one or more reference objects. The characterization of reference objects or classes as feature descriptors or vectors is referred to as feature extraction for the classification system.

In a preferred embodiment, classifying the object based on the extracted invariant shape features may include computing a plurality of differences between the generalized invariant feature vector and respective generalized invariant feature vectors corresponding to a plurality of reference objects, or classes of reference objects (where, for example, each respective generalized invariant feature vector comprises an average of generalized invariant feature vectors for a respective one or more reference objects), determining a minimum difference from the plurality of differences, where the minimum difference corresponds to a closest reference object of the plurality of reference objects or a closest class of reference objects, and outputting an indication of the closest reference object or class of reference objects (e.g., the reference object class) as a classification of the object. In one embodiment, the computed differences may be considered respective distances between the feature vectors in the feature space defined by the feature set, and in a general sense may be referred to as distances between the object of interest and the reference objects (or classes), described in detail above.

As FIG. 5 also shows, in one embodiment, the method may also optionally include making a decision based on the classification of the object, as indicated in 508. For example, a decision may be made to initiate an action, such as logging results, activating an alarm, performing a motion control operation, and so forth. In the exemplary machine vision system described above with reference to FIG. 4, if the system determines that an item being inspected matches a reference object or symbol that corresponds to a malformed or "bad" item, a motion control operation may be initiated to remove the offending item from the conveyor belt. Of course, any other type of decision(s) or action(s) may be performed as desired. One embodiment of an exemplary decision process is described below with reference to FIG. 10.

In one embodiment, the generalized invariant shape feature descriptor may be used in combination with other feature descriptors, such as, for example, scale- and/or reflection-dependent feature descriptors, described below with reference to FIGS. 6A, 6B, and 7. For example, a weighted parallel object classification scheme is described below with reference to FIGS. 9A and 9B in which a plurality of feature descriptors are used to classify an object of interest, e.g., in a serial computation (FIG. 9A), or in a distributed computation system (FIG. 9B).

Figure 6A:
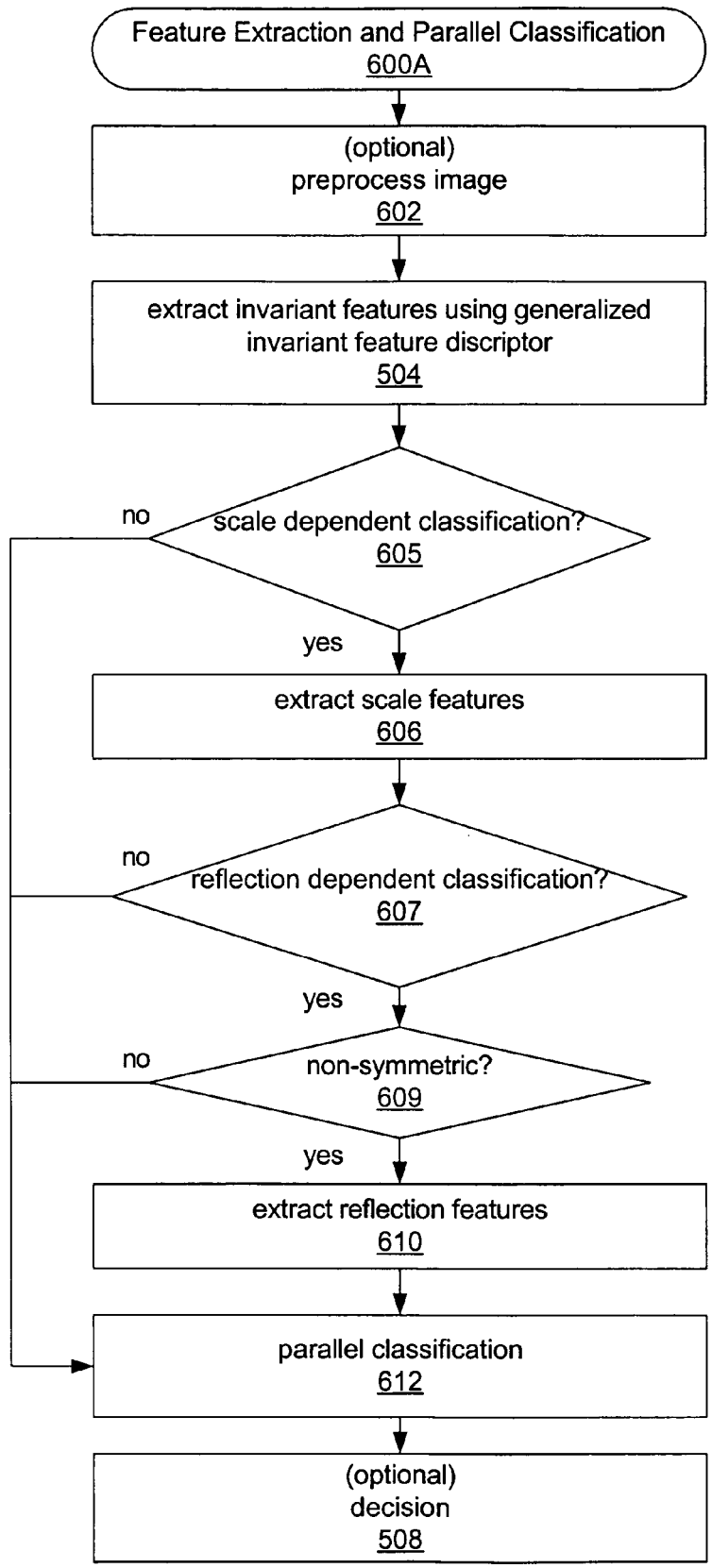
FIGS. 6A and 6B are flowchart diagrams illustrating embodiments of a method for feature extraction and parallel classification of an image object.
Figure 6B:
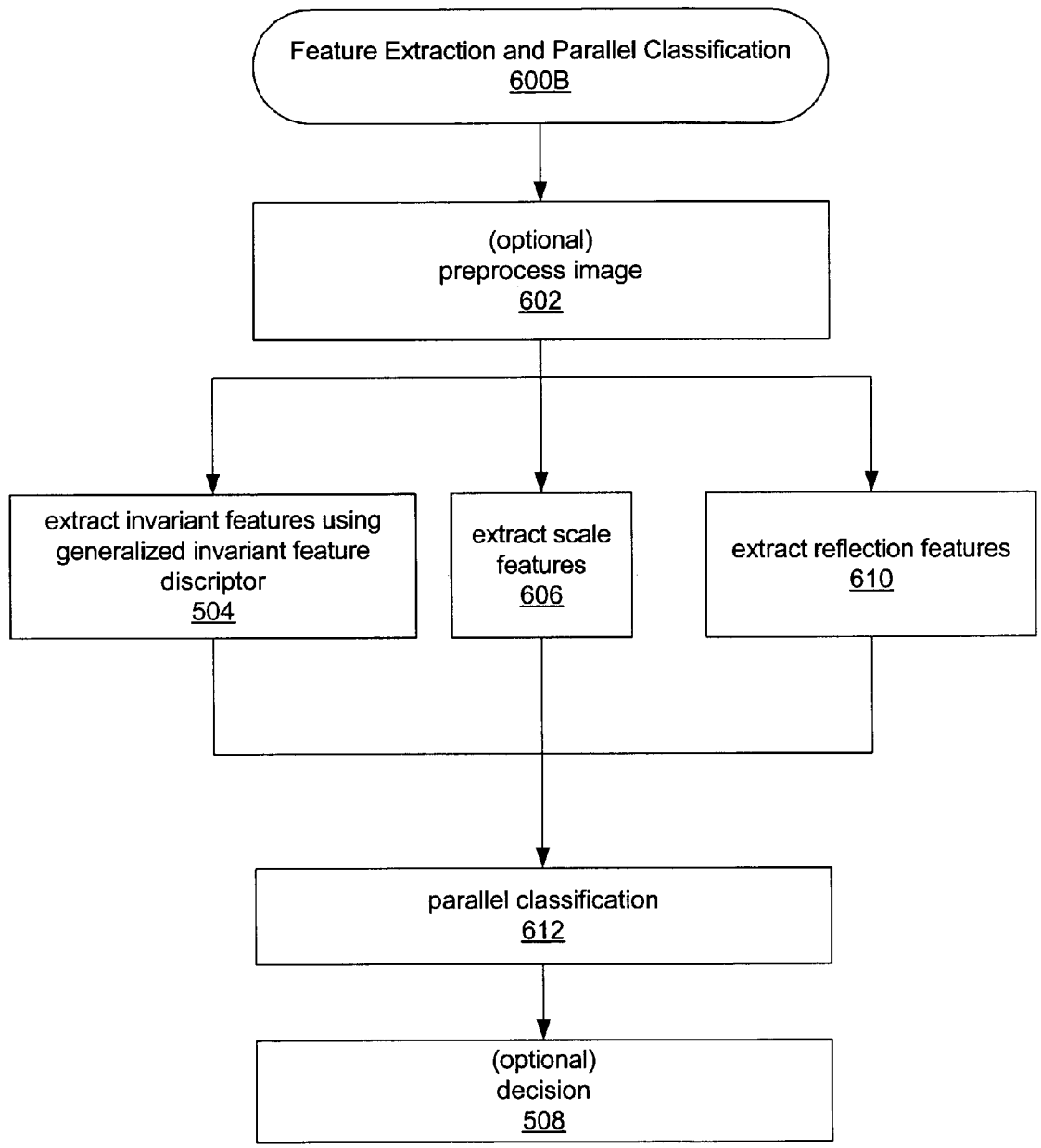

FIGS. 6A and 6B—Feature Extraction and Parallel Classification

FIGS. 6A and 6B flowchart embodiments of a method for feature extraction and parallel classification of an object, e.g., an image object, such as a blob, comprised in an image. It is noted that the methods described herein may also be used to classify an object in a data set. It is further noted that in various embodiments, the methods described below may be performed by a single computer system, e.g., using multiple execution threads, or may be performed by a distributed computer system, e.g., where a plurality of computer systems are coupled over a network. As noted above, in various embodiments, some of the method elements described may be performed concurrently, in a different order than shown, or omitted. Additional method elements may also be performed as desired. Note that when element steps are the same as those described with reference to a previous figure, the descriptions may be abbreviated.

It should be noted that the term "parallel classification" refers to the use of multiple feature sets or descriptors to characterize or classify an image object, e.g., the invariant and non-invariant feature descriptors or vectors described herein, and that such a feature extraction and classification process may be implemented serially or in parallel, execution-wise. FIG. 6A illustrates an embodiment of the method wherein the feature extraction is performed serially, while FIG. 6B illustrates an embodiment wherein extraction of the various feature sets is performed in parallel, e.g., via multiple execution threads, or in a distributed computing system.

As FIG. 6A shows, in 602, a received image may optionally be preprocessed, as described above. For example, various filters or other operations may be applied to the image data to make subsequent processing of the image more effective or easier, including, for example, thresholding the image to convert a multi-scale image to a binary image, filtering the image data to remove noise, objects smaller than some specified size, all but the largest object, and so forth. Of course, in various embodiments, any type of filtering or preprocessing may be applied to the image (or data set) as desired.

In 504, In 504, invariant shape features may be extracted from the image using a generalized invariant shape feature descriptor, as described above with reference to FIG. 5.

In 605, a determination may be made as to whether the classification of the image object is to be scale dependent, and as shown, if the classification is not to be scale dependent, the method may proceed to 612. Note that in various embodiments, this determination may be made and indicated by the user, e.g., via user input, or may be made programmatically, e.g., based on the types of image being processed, the application, and so forth.

If, however, the classification is determined to be scale dependent, then one or more scale features of the object may be extracted, as indicated in 606. In one embodiment, extracting the one or more scale features of the object may comprise determining the area of the object. As is well known in the art, the area of an object generally increases with the size or scale of the object, and thus, the determined area may serve to distinguish the object from similarly shaped objects of different size.

In 607, a determination may be made as to whether the classification of the image object is to be reflection dependent, and if the classification is not to be reflection dependent, the method may proceed to 612, as shown. As described above in 605, in various embodiments, this determination may be made and indicated by the user, e.g., via user input, or may be made programmatically, e.g., based on the types of image being processed, the application, and so forth.

If, however, the classification is determined to be reflection dependent, then the method may make a determination as to whether the object is symmetric or non-symmetric, as indicated in 609. In one embodiment, this determination may be made by computing a symmetry factor for the object, and comparing the computed symmetry factor to a specified value, such as a symmetry threshold. Further details of one embodiment of the symmetry factor and its use are provided below with reference to FIGS. 7A and 7B.

If in 609, the object is determined to be symmetric, then the method may proceed to 612, as shown. If, however, the object is determined to be non-symmetric, then in 610, one or more reflection features for the object may be extracted. For example, extracting the one or more reflection features may include determining a difference between the orientation of the object and the orientation of the object's maximum Feret diameter. Further details of reflection feature extraction are provided below with reference to FIGS. 7A and 7B.

Once the features are extracted from the object, i.e., the shape invariant features, and optionally the scale and/or reflection features, then in 612, a parallel classification process may use the extracted features to determine a classification of the object. More specifically, the parallel classification process may compare the extracted features, e.g., in the form of one or more feature vectors, to feature characterizations or vectors representing a plurality of reference objects, and determine which reference object most closely matches the object of interest. Further details of the parallel classification process are described below with reference to FIGS. 8, 9A and 9B.

Finally, a decision may optionally be made based on the classification of the object, as indicated in 508, and as described above with reference to FIG. 5. For example, a decision may be made to initiate an action, such as logging results, activating an alarm, performing a motion control operation, and so forth.

The method illustrated in FIG. 6B is similar to that of FIG. 6A, but emphasizes parallel execution of the feature extraction process, and omits the optionality of the non-invariant feature extraction, although of course, in other embodiments of the method of FIG. 6B, the non-invariant feature extractions may be optional.

As FIG. 6B indicates, once the image is (optionally) pre-processed, the invariant features, the scale feature(s), and the reflection feature(s) may be extracted, e.g., in parallel, as indicated in 504, 606, and 610. For example, in one embodiment, each of the feature extraction processes (504, 606, and 610) may be implemented in hardware, such as, for example, a programmable hardware element such as an FPGA. In another embodiment, the feature extraction processes may be performed by respective computers coupled together over a network. In a further embodiment, the feature extraction processes may be performed by respective execution threads or equivalent in a single computer system.

Once the features are extracted in 504, 606, and 610, the resulting feature sets, e.g., feature vectors, may be provided to the parallel classification process, as indicated in 612, as described above. As also shown, an optional decision process 508 may initiate an action based on the classification of 612.

Although the non-invariant features described above relate to scale and reflection, in other embodiments, either in addition to, or instead of, the scale and reflection features, other invariant or non-invariant features may be extracted and used in combination with the invariant shape features to classify the object, as desired. For example, in the case of images that include color information, spectral analysis may be used to further classify the object of interest.

Thus, various embodiments of the present method may use the generalized invariant shape feature descriptor to characterize an object of interest in an image or other data set, and may further use the generalized invariant shape feature descriptor, e.g., in the form of a feature vector, to classify the object, optionally in combination with other, e.g., non-invariant, feature descriptors or feature sets, such as, for example, scale and reflection features.

Figure 7A:
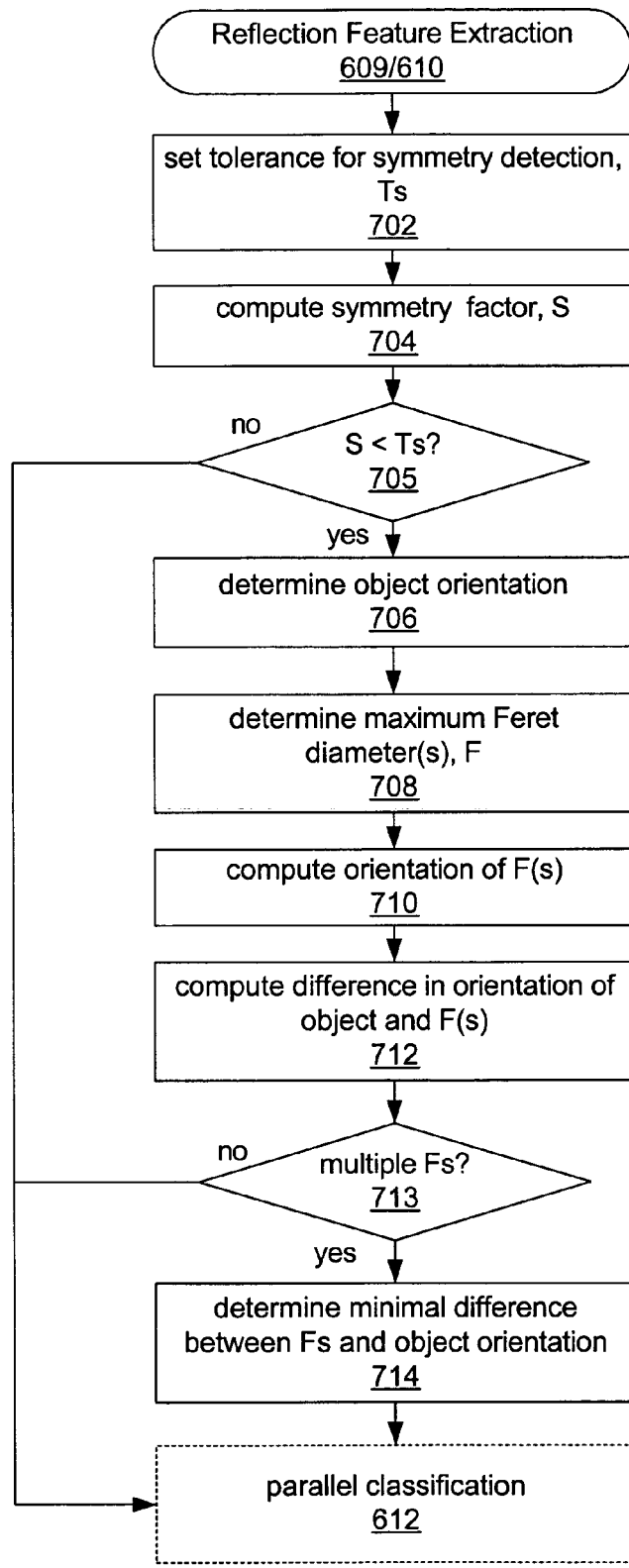
FIG. 7A is a flowchart diagram illustrating one embodiment of a method for reflection feature extraction.
Figure 7B:
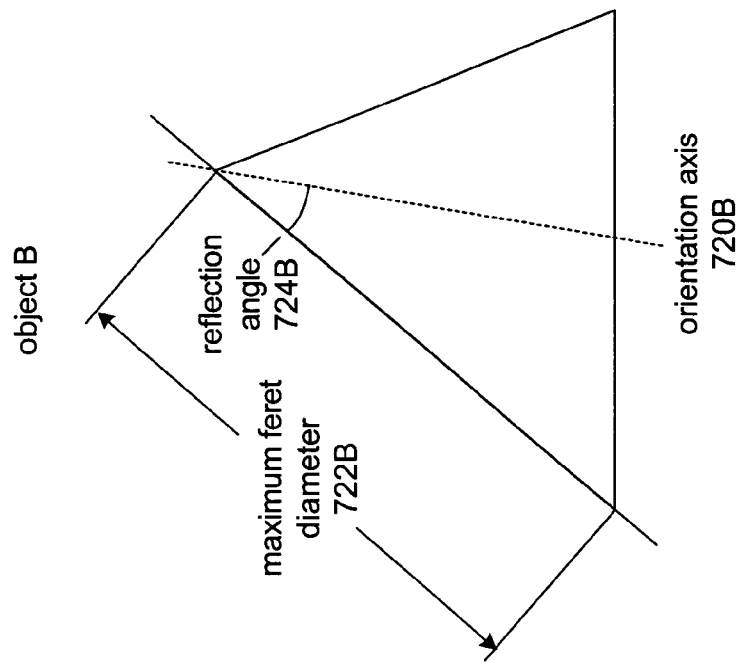
FIG. 7B illustrates objects with reflection-dependent features, according to one embodiment.
Figure 7B:
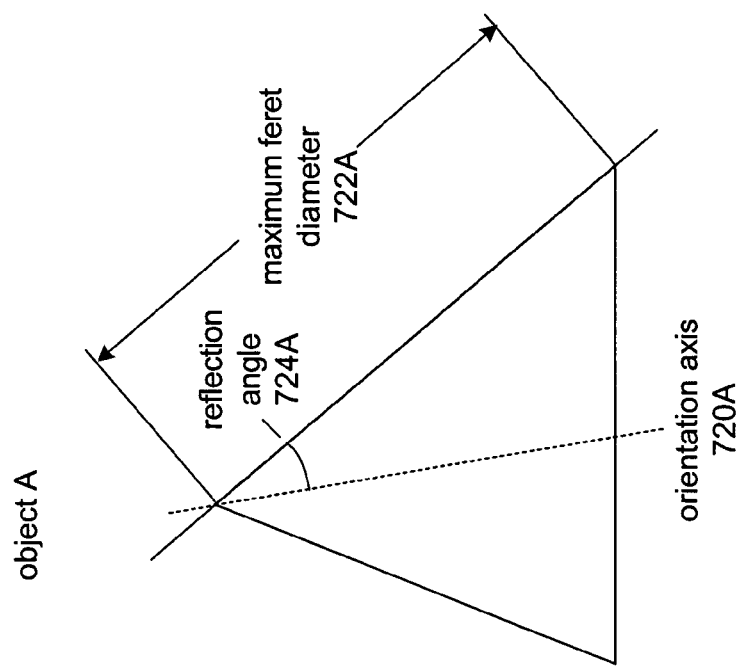

FIGS. 7A and 7B—Reflection Feature Extraction

FIG. 7A is a flowchart of one embodiment of a method for extracting reflection features of an object of interest in an image or other data set. More specifically, FIG. 7A illustrates an exemplary embodiment of the method element 610 (optionally, with 609), described above with reference to FIGS. 6A and 6B. As noted above, in various embodiments, some of the method elements described may be performed concurrently, in a different order than shown, or omitted. Additional method elements may also be performed as desired. As also noted above, when element steps are the same as those described with reference to a previous figure, the descriptions may be abbreviated.

Note that in the embodiment shown, for reasons of efficiency, a pre-test for symmetry is applied to the image object, possibly obviating the reflection feature extraction; however, in other embodiments, the method may simply extract the reflection feature(s) without such pre-testing.

As shown in FIG. 7A, in 702, a tolerance level for symmetry detection may be set or otherwise specified, referred to as $T_s$. In various embodiments, the tolerance level may be pre-computed, and thus simply retrieved from memory, input by a user, computed in real-time, or received from an external process or system.

A symmetry factor S may be computed for the object, as indicated in 704. In a preferred embodiment, the symmetry factor may be computed thusly:

$$S = [abs(Hu\ Moment\ 7)]^{1/4}$$

where abs( ) is the absolute value function, and $$Hu\ Moment\ 7 = (3\eta_{21} - \eta_{03})(\eta_{03} + \eta_{12})[(\eta_{30} + \eta_{12})^2 - 3(\eta_{21} + \eta_{03})^2] - (3\eta_{12} - \eta_{30})(\eta_{03} + \eta_{21})[(\eta_{03} + \eta_{21})^2 - 3(\eta_{30} + \eta_{12})^2]$$

and where $\eta_{03}$, $\eta_{30}$ $\eta_{12}$ and $\eta_{21}$ are the normalized third order central moments of the object, as is well known in the art.

Then, in 705, a determination may be made as to whether the symmetry factor is less than the specified tolerance, where the symmetry factor being less than the specified tolerance indicates that the object is to be classified using reflection dependent features. Note that in other embodiments, the relationship between the symmetry factor and the tolerance level may be different. For example, in one embodiment, the symmetry factor and the tolerance level may be defined such that a reflection-based classification is indicated if the symmetry factor meets and/or exceeds the tolerance level.

If in 705 the method determines that the object is to be classified using reflection dependent features, then in 706 the object's orientation may be determined. In one embodiment, the orientation of the object is the angle of a line (e.g., with respect to a specified axis) that passes through the object's center of mass about which the object has the lowest moment of inertia. If, on the other hand, the method determines that the object is not to be classified using reflection dependent features, then in embodiments where other feature sets are used, e.g., invariant features, scale features, etc., the method may proceed with extraction of other feature sets, or to the parallel classification 612 described above, if the other features have already been extracted, indicated by the dashed block 612 of FIG. 7A.

As FIG. 7A also shows, in 708 an orientation of a maximum Feret diameter of the object may be determined, where, as mentioned above and as is well known in the art, the maximum Feret diameter of the object is a line segment connecting the two perimeter points of the object that are the furthest apart. Some objects may have multiple maximum Feret diameters, and so in some embodiments, a plurality of maximum Feret diameters for the object may be determined.

In 710, each Feret diameter's orientation may be computed, e.g., with respect to the same specified axis used to determine the object's orientation in 706, and in 712, differences between the orientation of the object and each of the determined maximum Feret diameters may be computed. In other words, the angle between the object's orientation and each maximum Feret diameter may be determined.

FIG. 7B illustrates an example of two objects (triangles A and B) that are reflection symmetric with respect to one another, i.e., are mirror images each other. More specifically, FIG. 7B illustrates the concept of a reflection dependent feature. As FIG. 7B shows, each of the two triangles A and B has a respective orientation axis 720 as defined above, a respective maximum Feret diameter 722, and a respective reflection angle 724. An example of a reflection dependent feature is the reflection angle, in that the reflection angles 724A and 724B of the two triangles have the same absolute value, but differ in sign, and thus are reflection dependent.

As shown, in 713, a determination may be made as to whether there is more than one maximum Feret diameter of the object. If there is only one maximum Feret diameter, the method may proceed, e.g., with extraction of other feature sets, or to the parallel classification 612 described above, if the other features have already been extracted, indicated by the dashed block 612 of FIG. 7A.

If there is more than one maximum Feret diameter of the object, then in 714, a minimum difference between the orientation of the object and the orientations of the one or more maximum Feret diameters of the object may be determined, where the one or more reflection features of the object comprise this minimum difference. Said another way, the minimal difference computed between the object's orientation and that of each maximum Feret diameter is the extracted reflection feature. Thus, in one embodiment, this feature, like the scale feature (area of the object) described above, may comprise a one dimensional feature vector, i.e., a scalar value.

Finally, as shown, once the reflection feature or features are extracted, the method may optionally use the extracted reflection feature(s) to classify the object, preferably in conjunction with one or more feature vectors, such as the generalized invariant shape feature descriptor and the scale feature vector described above, as indicated by the dashed parallel classification block 612.

Thus, in one embodiment of the present invention, in addition to the extraction of invariant shape features described above with reference to FIG. 5, one or more non-invariant features of the object may be extracted, and one or more non-invariant feature descriptors for the object may be determined based on the extracted one or more non-invariant features of the object.

Once the various feature descriptors have been determined or computed, a parallel classifier may analyze the feature descriptors and classify the object accordingly. Thus, in a preferred embodiment, classifying the object based on the extracted invariant shape features (506 of FIG. 5) may comprise classifying the object based on the extracted invariant shape features and the extracted one or more non-invariant shape features.

Further details of the parallel classification are provided below.

Figure 8:
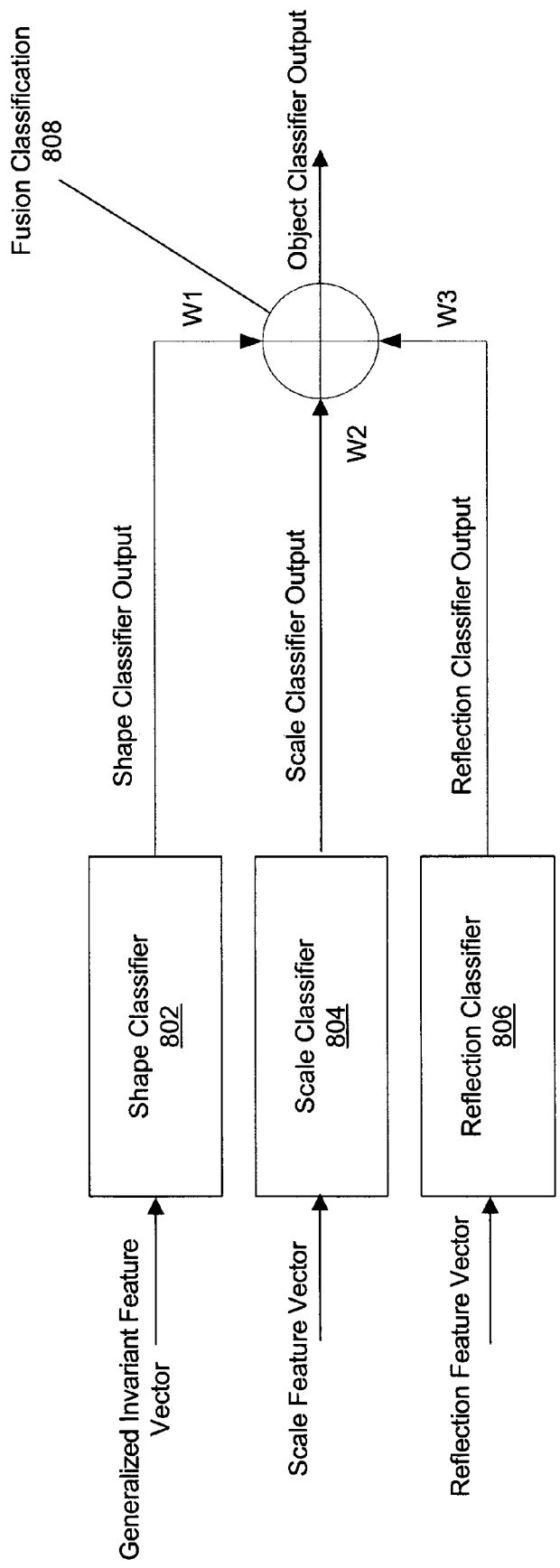
FIG. 8 is a block diagram of a parallel classification system, according to one embodiment.

FIG. 8—A Parallel Classifier

FIG. 8 is a high-level block diagram illustrating a parallel classifier, according to one embodiment of the invention. As FIG. 8 shows, a plurality of shape feature vectors or descriptors may be received to a corresponding plurality of object classifiers. In this particular embodiment, the parallel classifier includes a shape classifier 802 which is operable to receive an invariant shape feature vector, i.e., the generalized invariant feature descriptor for the object, and generate a shape classifier output, a scale classifier 804 which is operable to receive a scale feature vector, i.e., the area of the object, and generate a scale classifier output, and a reflection classifier 806, which is operable to receive a reflection feature vector, i.e., the determined orientation difference of 712 or 714 of FIG. 7A, and generate a reflection classifier output, as shown. It should be noted that the plurality of classifiers may be implemented and executed on a single device, e.g., serially or via multiple execution threads, or may be implemented and executed on respective devices, e.g., computers coupled over a network, and/or programmable hardware elements, among others.

As also shown, the parallel classifier may also include a fusion classification process 808, which may be operable to receive the various classifier outputs, optionally weighted with respective weighting factors, analyze the (weighted) classifier outputs, and generate an object classifier output based on the analysis.

In one embodiment, the respective weights applied to each feature vector may be constrained, i.e., specified to have a particular relationship with one another, e.g., the sum of the weights may be normalized to a specified value. For example, in an embodiment where three different descriptors or feature vectors are used, e.g., the generalized invariant feature vector, the scale feature vector, and the reflection feature vector, the three weights may have the following relationship:

$$w_1+w_2+w_3=1$$

Some specific example cases for weight settings in the parallel classification systems are as follows:

$w_1=1$, $w_2=w_3=0$ shape invariant classification, $w_1 \neq 0$, $w_2 \neq 0$, $w_3=0$ shape invariant and scale dependent classification, $w_1 \neq 0$, $w_2=0$, $w_3 \neq 0$ shape invariant and reflection dependent classification, and $w_1 \neq 0$, $w_2 \neq 0$, $w_3 \neq 0$ shape invariant, scale dependent, and reflection dependent classification.

Further details of the parallel classification process are described below with reference to FIGS. 9A and 9B.

Figure 9A:
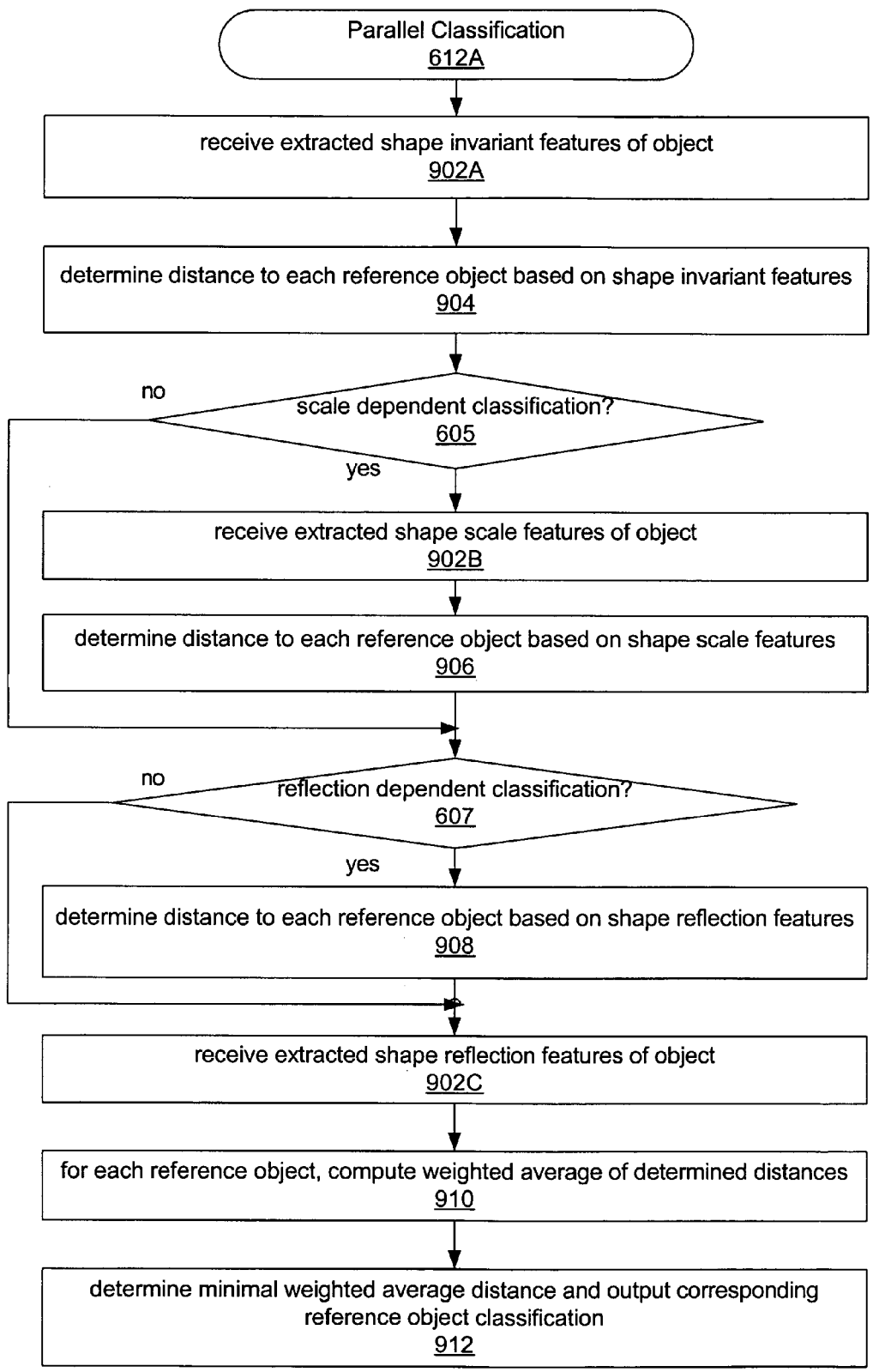
FIGS. 9A and 9B are flowchart diagrams illustrating embodiments of a method for parallel classification of an image object.
Figure 9B:
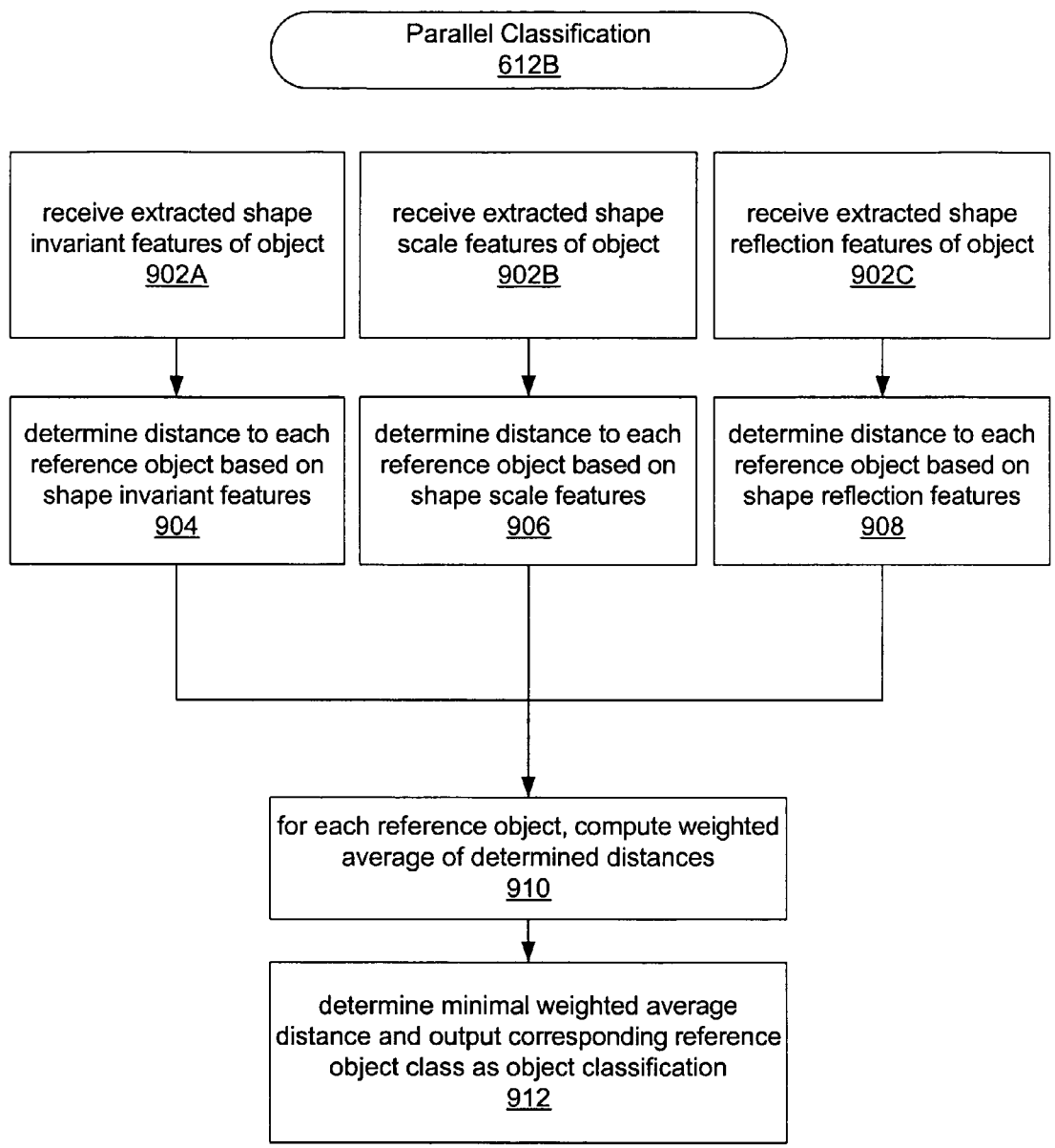

FIGS. 9A and 9B—Parallel Classification

FIGS. 9A and 9B flowchart embodiments of a method for parallel classification of an object, such as an image object. More specifically, FIGS. 9A and 9B flowchart embodiments of the parallel classification 612 of FIGS. 6, 7, and 8. As noted above, the term "parallel classification" refers to the classification of an object using a plurality of feature sets, vectors, or descriptors, such as, for example, the generalized invariant feature descriptor, e.g., the generalized invariant feature vector, the scale feature vector, and the reflection feature vector described above. As also noted above, in various embodiments, the parallel classification process may be performed serially on a single machine, via multiple execution threads or equivalent on a single machine, or may be distributed across a plurality of computers or other devices, such as FPGAs, and so forth, for parallel or substantially parallel execution.

As described above with reference to FIG. 8, a primary feature of the parallel classifier is that a plurality of different classifiers may be used to provide respective classifier outputs, which may then be merged and/or analyzed together and used to generate a classification of the object. FIG. 9A illustrates an embodiment of a serial method process, while FIG. 9B represents an embodiment of a parallel implementation of the process.

As mentioned above, in various embodiments, some of the method elements described may be performed concurrently, in a different order than shown, or omitted. Additional method elements may also be performed as desired. As also mentioned above, when element steps are the same as those described with reference to a previous figure, the descriptions may be abbreviated.

As FIG. 9A shows, in 902A, extracted shape invariant features of the object may be received, preferably in the form of the generalized invariant feature descriptor for the object.

In 904, a "distance" from the object to each of a plurality of reference objects may be determined based on the extracted shape invariant features of the object. Said another way, differences between the object and each of the plurality of reference objects or classes, e.g., as represented by descriptors or prototypes (e.g., feature vectors) stored in one or more class files, may be determined based on each object's shape invariant features. For example, as described above, the extracted shape invariant features of the object characterizing the object are preferably in the form of the generalized invariant feature descriptor for the object, and each reference object or class is similarly represented by a respective generalized invariant feature descriptor, where each descriptor comprises a feature vector in a feature space defined by the components of the descriptors. In other words, the generalized invariant feature descriptor comprises a generalized invariant feature vector comprising respective components corresponding to the extracted invariant shape features, and computing a shape classifier output may include computing a plurality of distances between the generalized invariant feature vector and respective generalized invariant feature vectors corresponding to a plurality of reference objects, or classes of reference objects, where for example, each respective generalized invariant feature vector comprises an average of generalized invariant feature vectors for a respective one or more reference objects.

Thus, a difference, i.e., a distance, may be computed between the feature vector of the object of interest and each representative feature vector of the reference objects or classes, also referred to generally as the distance between the respective objects/classes. It is noted that there is a variety of different distances defined between such feature vectors, some of which are described below.

In 605, a determination may be made as to whether the classification of the image object is to be scale dependent, as described above with reference to FIG. 6A. If the classification of the image object is to be scale dependent, then in 906, a distance from the object to each of the plurality of reference objects may be determined based on the extracted scale features of the object. In other words, similar to 904 above, the differences between the object's scale feature vector and each reference object's scale feature vector may be determined or computed.

In 607, a determination may be made as to whether the classification of the image object is to be reflection dependent, as described above with reference to FIG. 6A. If the classification of the image object is to be reflection dependent, then in 908, a distance from the object to each of the plurality of reference objects may be determined based on the extracted reflection features of the object. In other words, similar to 904 and 906 above, the differences between the object's reflection feature vector and each reference object's reflection feature vector may be determined or computed.

Thus, for each type of feature descriptor used in the classification process, differences or distances may be computed between the object of interest and each of the plurality of reference objects or symbols, as represented by their respective feature descriptors. Thus, in one embodiment, a shape classifier output may be computed based on the extracted invariant shape features, and one or more respective non-invariant classifier outputs may be computed based on the extracted one or more non-invariant features.

Described in the terms used above to describe the parallel classifier of FIG. 8, in one embodiment, each of the one or more non-invariant feature descriptors comprises a respective non-invariant feature vector comprising at least one component corresponding to at least one of the one or more non-invariant features, and computing one or more respective non-invariant classifier outputs may include: for each of the one or more non-invariant feature descriptors, computing a plurality of distances between the non-invariant feature vector and respective non-invariant feature vectors corresponding to the plurality of reference objects.

In 910, a weighted average of the determined distances (differences) corresponding to each reference object may be computed. In other words, for each reference object, the distances determined using each feature descriptor may be weighted and averaged, thereby generating a plurality of weighted average distances between the object and the plurality of reference objects.

Finally, in 912, a minimum weighted average distance may be determined from the plurality of weighted average distances, and a corresponding object classification output as the object classification, e.g., the classification of the closest reference object or class of reference objects.

Described in the more general terms used above to describe the parallel classifier of FIG. 8, in one embodiment, the shape classifier output and each of the respective classifier outputs may be weighted with respective classifier weighting factors, thereby generating a weighted shape classifier output, and one or more respective weighted non-invariant classifier outputs. The weighted shape classifier output and the one or more respective weighted non-invariant classifier outputs may then be combined to generate a classifier output, and the object classified based on the generated classifier output. As mentioned above, in a preferred embodiment, classifying the object based on the generated classifier output may include determining a minimum weighted average distance from the plurality of weighted average distances, where the minimum weighted average distance corresponds to a closest reference object of the plurality of reference objects or class of reference objects, and outputting an indication of the closest reference object or class as a classification of the object.

Thus, in one embodiment, combining the weighted shape classifier output and the one or more respective weighted non-invariant classifier outputs to generate a classifier output may include averaging respective distances of the weighted shape classifier output and the one or more respective weighted non-invariant classifier outputs corresponding to each of the plurality of reference objects or classes of references objects, thereby computing a plurality of weighted average distances corresponding to the plurality of reference objects or classes of references objects.

As described above, in an exemplary embodiment, the one or more non-invariant features of the object includes one or more of a scale feature of the object, and a reflection feature of the object, in which case, computing the one or more respective non-invariant classifier outputs includes computing a scale classifier output based on the extracted scale feature, and/or computing a reflection classifier output based on the extracted reflection feature.

Note that while 910 and 912 described averaging the distances, other means of combining the weighted distances are also contemplated, such as, for example, simply summing them. In some embodiments, the distances may not be weighted at all, equivalent to weighting factors of unity.

As mentioned above, in some embodiments, computing a shape classifier output based on the extracted invariant shape features and computing one or more respective non-invariant classifier outputs based on the extracted one or more non-invariant features may be performed substantially in parallel.

FIG. 9B illustrates an embodiment of the method of FIG. 9A, but where the various classifiers are operated or implemented in parallel. Similar to the method of FIG. 6B, the embodiment shown in FIG. 9B omits the optionality of the scale and reflection classification (605 and 607), although in other embodiments, these method elements may be included as desired. Note that with these exceptions, the method elements are the same as the respective method elements of FIG. 9A.

Distance Metrics

As mentioned above, in determining a difference or distance between the various feature vectors representing or corresponding to the object of interest and the various reference objects or symbols, any of various distance metrics may be used for a specific classification, such as, for example, Chebyshev distance ($L_\infty$ norm), city-block distance ($L_1$ norm), and Euclidean Distance ($L_2$ norm), among others. For example, let $X=[x_1, x_2, \ldots x_n]^T$ and $Y=[y_1, y_2, \ldots y_n]^T$ be two feature vectors. The distance between X and Y may be defined for these distance metrics as follows:

$$\text{Chebyshev distance: } D(X, Y) = \max_i |x_i - y_i|$$

$$\text{City-block distance: } D(X, Y) = \sum_{i=1}^{n} |x_i - y_i|$$

$$\text{Euclidean distance: } D(X, Y) = \sqrt{\sum_{i=1}^{n} (x_i - y_i)^2}$$

While these distance metrics (or metric distances) quantify differences between multi-component vectors in the feature space, in some embodiments, one or more feature vectors or descriptors may comprise single-component vectors, i.e., scalars. For example, as described above, in some embodiments, scale and reflection features may be represented by scalar values, more specifically, the scale feature for an image object may comprise the area of the object, and the reflection feature may comprise an angle. Thus, in some embodiments, non-metric distances may be used to represent feature space "distances" (differences) between image objects. In one embodiment, these non-metric distances may be computed thusly:

$$\text{Scale distance} = \frac{|A_1 - A_2|}{\max(A_1, A_2)}$$

$$\text{Reflection distance} = \frac{|F_1 - F_2|}{\max(F_1, F_2)}$$

where $A_i$ is the area of each object, and $F_i$ is the computed reflection feature of each object, i.e., the difference in orientation between the orientation of the object and the orientation of its maximum Feret diameter, as described above. As may be seen, each of these non-metric distances is automatically normalized to unity. Of course, other representations of distance may also be used as desired, the above being but exemplary approaches for difference quantification.

Additionally, classification of the object based on distances between the object and the reference objects or classes, as represented by the feature descriptors or vectors, may be performed using any of a variety of techniques, as are well known in the art.

For example, in a minimum mean distance classification approach, where, for example, $\{X_1^j, X_2^j, \ldots, X_{n_j}^j\}$ are $n_j$ feature vectors that represent a class $C_j$, the center of the class j is defined as:

$$M_j = \frac{1}{N_j} \sum_{i=1}^{n_j} X_i^j$$

The classification process classifies an input feature vector X of an unknown object or class based on its distance to each class center.

$$X \in \text{Class } C_j, \text{ if } d(X, M_j) = \min_i d(X, M_i)$$

where $d(X, M_i)$ is the distance function based on a distance metric such as Euclidean distance or city block distance. In cases where feature pattern variability and other corruptive influences are well behaved, the feature patterns of each class tend to cluster tightly about the class center. Under these conditions, a minimum mean distance classifier may be effective since it only computes the input vector's distance to the centers of classes instead of to each of the representative samples, thus facilitating real-time classification.

In nearest neighbor classification approaches, the distance of an input feature vector X of the unknown object or class to a class $C_j$ is defined as the distance to the closest samples or reference objects (as represented by feature descriptors) that are used to represent the class:

$$d(X, C_j) = \min_i d(X, X_i^j)$$

where $d(X, X_i^j)$ is the distance between X and $X_i^j$.

The classification rule assigns a pattern X of unknown classification to the class of its nearest neighbor:

$$X \in \text{Class } C_j, \text{ if } d(X, C_j) = \min_i d(X, C_i)$$

Nearest neighbor classification is the most intuitive approach for classification. In case that representative feature vectors for each class are available, the nearest neighbor classification can work well to most classification problems. In some classification problems, a class, e.g., a good part or bad part, may be represented by multiple descriptors or prototypes that are not in the same cluster, and so the nearest neighbor approach may be more effective than the nearest mean distance approach.

In k-nearest neighbor classification approaches, an input feature vector X is classified as a class $C_j$ based on a voting mechanism. The classifier finds k nearest samples from all of the reference classes. The input feature vector of the unknown object or class is assigned to the class with majority of the votes in the k nearest samples. Nearest neighbor classification can be considered as a special case of k-nearest neighbor classification with k=1.

Note that the outlier feature patterns caused by noise in real-world applications may cause misclassification in nearest neighbor classification approaches. The k-nearest neighbor classification may thus be more robust to noise compared with nearest neighbor classification.

Other techniques and systems, such as neural networks and support vector machines, may also be used to classify objects. For example, an artificial neural network, motivated by biological learning systems, learns from data, e.g., real world data, and modifies its parameters to improve its performance. The learning result is encoded in a set of data called weights. At run time, the classification process is just a straightforward data flow through the neural network, and does not require a searching process. It may thus be more efficient in terms of both speed and memory compared with the nearest neighbor classifier. However, the training process of neural networks is not as straightforward as with nearest neighbor classifiers.

It should be noted that the parallel classification process described above may be implemented in a variety of different ways. For example, one or more of the different classifiers comprised in the parallel classifier may be implemented as a neural network, a support vector machine, an expert system, or other type of classifier, as desired.

Figure 10:
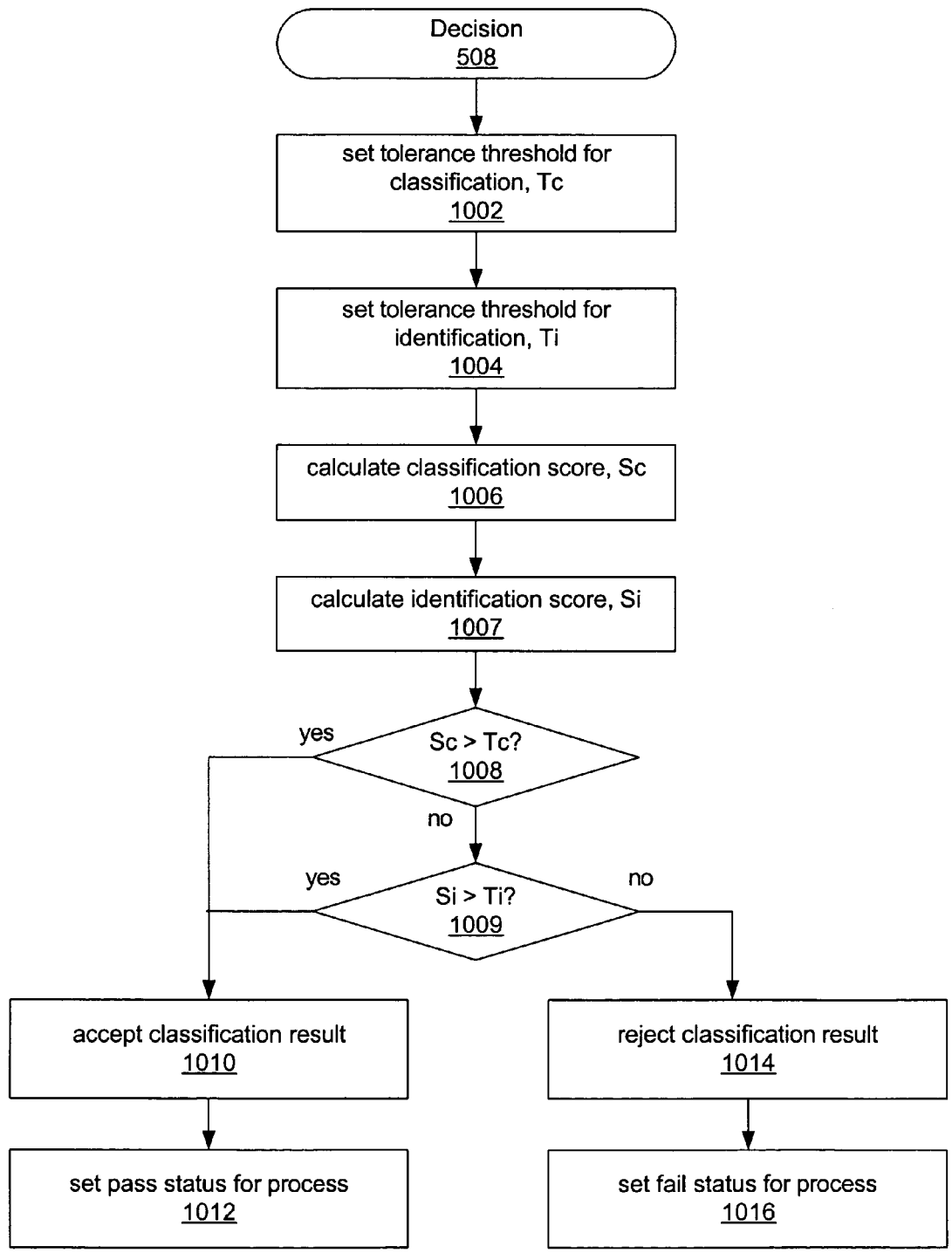
FIG. 10 is a flowchart diagram illustrating one embodiment of a method for decision making based on an object classification.

FIG. 10—Decisions Based on Object Classification

As noted above, in some embodiments, a decision process may operate to make a decision based on the object classification, e.g., a decision to initiate an action or operation, such as logging an event or condition, initiating a motion control operation, and so forth, related to the application or process within which the classification is performed. FIG. 10 flowcharts one embodiment of a decision process 508, although it should be noted that the decision process of FIG. 10 is intended to be exemplary only, and is not intended to limit the decision process to any particular form or function. Note that the decision process described below assumes that a classification for the object has been made, e.g., via the classification process 612.

As noted above, in various embodiments, some of the method elements described may be performed concurrently, in a different order than shown, or omitted. Additional method elements may also be performed as desired.

As shown in FIG. 10, in 1002, a tolerance threshold for classification, $T_c$, may be set or otherwise specified. The classification tolerance threshold may be determined based on any of a variety of factors. For example, the classification tolerance threshold may be determined based on the standard deviation of a set of target images, based on a noise level of the target image, and so forth.

In 1004, a tolerance threshold for identification, $T_i$, may be set or otherwise specified. The identification tolerance threshold may be determined based on any of a variety of factors, such as, for example, based on the standard deviation of a set of reference images, based on a noise level of the target image, and so forth.

One way to determine tolerance thresholds is to execute the classifier using a testing data (image) set, and analyzing the resulting score distribution. For example, in classification defective and good parts, the identification score distribution (histogram) may indicate the percentage of samples that will be rejected based on a specified tolerance threshold. As another example, in sorting parts into multiple classes, the classification score may indicate the percentage of samples for which the classification system does not have enough confidence to assign a class, and thus has to reject, or require the attention of human operators. Based on the score distribution, a user may have a good idea regarding what thresholds to set for a specific application (assuming the testing data/image set is representative for the application).

Figure 11:
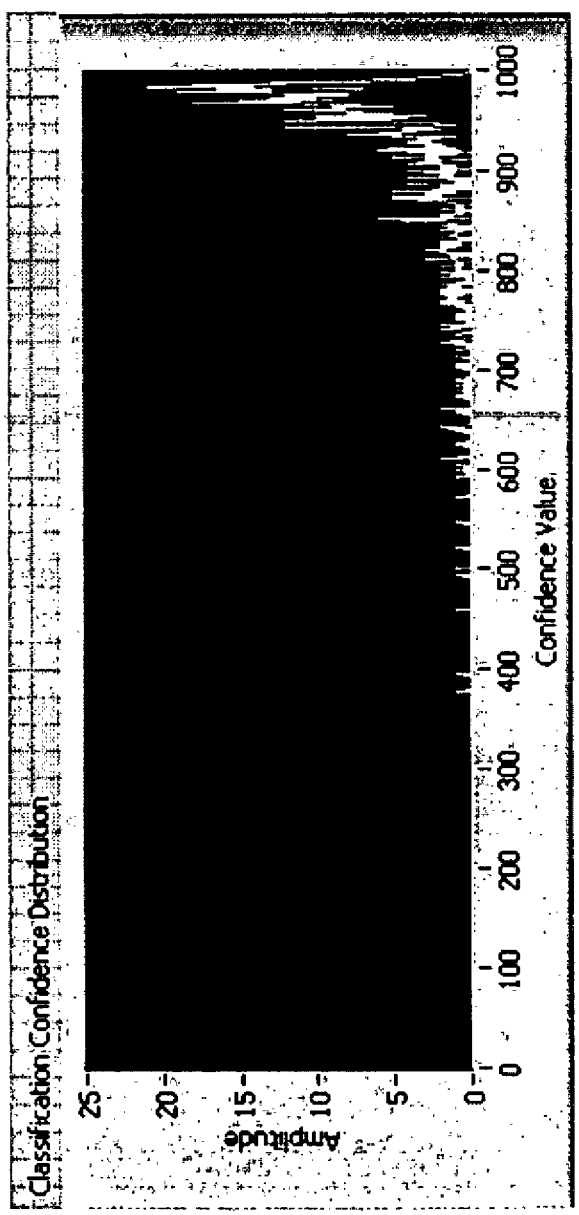
FIG. 11 illustrates an example classification confidence distribution, according to one embodiment.

FIG. 11 illustrates one embodiment of a classification confidence distribution for an example data/image set, referred to as a test set, where number of samples (e.g., images), represented by "amplitude", is plotted vs. confidence score. As is well known, the integral of the distribution gives the total number of samples. As one example of a way in which such a distribution may be used, if foreknowledge of the test set is available, e.g., the percentage or number of the images that should actually be successfully classified, the user may select a tolerance threshold that results in this percentage of images being "passed". As another example, if the user is aware of a typical "pass" percentage for real world applications, and if the test set is somewhat representative of real world data, the user may use the distribution to determine an appropriate tolerance threshold that results in approximately this percentage of passes.

Note that a classification confidence distribution from a testing data set may also be used for effective evaluation of the performance of a particular classifier, e.g., a classification algorithm.

In 1006, a classification score $S_c$ for the object of interested may be calculated. In one embodiment, the classification score may be considered a measure of confidence of the classification of the object determined by the classifier, described above, and may be useful for such applications as sorting and inspection. In one embodiment, the classification score or confidence may be computed as:

$$S_c = (1 - d1/d2) \times 1000$$

where d1 and d2 are the respective distances from the object to the closest reference object or class and the second closest reference object or class. Note that these distances are dependent upon the particular classification algorithm used.

In 1008, a determination may be made as to whether the classification score of the object $S_c$ is greater than the classification tolerance threshold $T_c$ of 1002, and if so, the method may proceed to 1010, described below.

If in 1008 the classification score $S_c$ is not greater than the classification tolerance threshold $T_c$, an identification score $S_i$ for the object may be calculated, as indicated in 1007. Similar to the classification score $S_c$, the identification score $S_i$ may represent a confidence in the identification of the object. Thus, the classification score $S_c$ and the identification score $S_i$ may together indicate an overall confidence in the classification of the object of interest. In one embodiment, the identification score $S_i$ for the object may be computed as:

$$S_i = (1 - d) \times 1000$$

where d is the normalized distance between the object of interest and the closest reference object or class. It should be noted that these scores are meant to exemplary only, and that other scores may be used as desired. For example, the factor of 1000 used in each calculation may clearly be omitted or replaced with a different constant.

In 1009, a determination may be made as to whether the identification score of the object $S_i$ is greater than the identification tolerance threshold $T_i$ of 1007, and if so, the method may proceed to 1010, and if not, the method may proceed to 1014, both of which are described below.

In 1010, (as a result of the comparison of 1008 and/or 1009) the classification result (from classifier 612) may be accepted, and in 1012, a pass status set for the application process. For example, in an automated manufacturing application where manufactured parts are automatically inspected for quality, a part successfully characterized as a "pass" may be sent on for packaging or further assembly.

In contrast, if the comparison of 1009 indicates that the confidence of the identification fails to meet or exceed the specified identification tolerance threshold, then in 1014, the classification result may be rejected, and in 1016, a fail status may be set for the application process. For example, in the automated manufacturing application example mentioned above, the part may be rejected and removed from the manufacturing line, or may require the attention of human operators.

Thus, the use of both classification confidence and identification confidence scores may be important in determining a meaningful result, e.g., for both sorting and inspection applications. As described above, the identification score may represent the similarity between the input or target object and the assigned class, and the classification confidence may represent the similarity of the input or target object and the two closest classes. Thus, in some embodiments, depending upon the classification of the object of interest and upon the confidence of the classification, a decision may be made regarding the disposition or meaning of the image object of interest, or of a material object represented by the image object.

It should be noted that the particular scores and decisions described above are meant to be exemplary only, and are not intended to limit the scores and decisions to any particular form or function.

Thus, various embodiments of the invention described herein may provide a general-purpose object shape classification tool for classification of objects with arbitrary position and orientation, optionally with scale- and/or reflection-dependencies. The system preferably has no constraints on the number of training samples (e.g., may support statistical or non-statistical training), or the number of classes for classification (e.g., may support general classification). Additionally, a substantially complete or generalized feature set for object shape description, i.e., an invariant shape descriptor feature set, is described, with little or no need for feature selection and feature normalization. In one embodiment, the generalized invariant feature descriptor includes a feature vector comprising eight possible features, including six invariant shape features defined in the interval [0,1], and two Hu moments that are non-linearly normalized into the interval [0,1]. These features may comprise a balanced combination of features that may comprehensively represent substantially all general distinguishing characteristics of an image object or blob shape.

In addition to the generalized or complete shape descriptor feature set, the system may further include a scale-dependent shape descriptor, and a reflection-dependent descriptor. The system may apply a parallel multi-classifier system for robust scale-dependent and reflection-dependent classification, using distance metrics such as Euclidean distance for the shape invariant features, and using non-metric distances for scale and reflection features. The system may output both classification and identification confidence scores for quantitative evaluation of the classification results for decision-making, e.g., to accept or reject the classification result.

Although many of the embodiments described herein relate to images and image processing, it is noted that the techniques described are broadly applicable to data sets and data processing. In other words, various embodiments of the invention may be used to extract and classify features determined from data as opposed to just images.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A computer-implemented method for analyzing an image, the method comprising one or more computers implementing:
   receiving an image, wherein the image is stored in a memory, and wherein the image comprises an object;
   extracting, by software executing on the computer, invariant shape features of the object using a generalized invariant feature descriptor, wherein the invariant shape features are features that are invariant with respect to scale, translation, rotation and symmetry, wherein the generalized invariant feature descriptor comprises a generalized invariant feature vector that represents attributes of the object in an invariant feature space defined by components of the generalized invariant feature descriptor, wherein the generalized invariant feature vector specifies a position in the invariant feature space, wherein the generalized invariant feature vector comprises comprising components corresponding to:
   roundness of the object;
   compactness of the object; holes of the object; and
   Hu Moments of the object; and
   classifying the object based on the extracted invariant shape features, wherein said classifying comprises comparing the position specified by the generalized invariant feature vector with positions of a plurality of corresponding generalized invariant feature vectors or partitions of the invariant feature space representing respective objects or classes of objects, and wherein said classifying comprises storing information classifying the object in a computer memory.

2. The method of claim 1, wherein the generalized invariant feature descriptor comprises a generalized invariant feature vector comprising respective components corresponding to:
   circularity of the object;
   elongation of the object;
   perimeter-ratio-based convexity of the object;
   area-ratio-based convexity of the object;
   hole-perimeter-ratio of the object;
   hole-area-ratio of the object;
   a function of Hu Moment 1 of the object; and
   a function of Hu Moment 2 of the object.

3. The method of claim 2, wherein the component corresponding to the circularity of the object comprises the reciprocal of the circularity of the object.

4. The method of claim 2, wherein the component corresponding to the elongation of the object comprises a normalized reciprocal of the elongation of the object.

5. The method of claim 2, wherein the function of Hu Moment 1 is Hu Moment 1.

6. The method of claim 2, wherein the function of Hu Moment 2 comprises the square root of Hu Moment 2.

7. The method of claim 2, wherein said extracting invariant shape features using a generalized invariant feature descriptor comprises: determining values for the respective components of the generalized invariant feature descriptor, thereby generating the generalized invariant feature vector corresponding to the object.

8. The method of claim 7, wherein the value for each of the respective components is normalized to a specified range.

9. The method of claim 8, wherein the specified range for each value is approximately zero to approximately one.

10. The method of claim 1, further comprising: preprocessing the image prior to said extracting invariant shape features.

11. The method of claim 10, wherein the received image comprises a multi-scale image, and wherein said preprocessing comprises thresholding the image to convert the image to a binary image.

12. The method of claim 10, wherein said preprocessing comprises performing edge detection of the image to determine a contour of the object, and wherein said extracting invariant shape features of the object is based on said contour.

13. The method of claim 10, wherein said preprocessing comprises performing color characterization of the image to segment the image, and wherein said extracting invariant shape features of the object is performed based on the segmented image.

14. The method of claim 10, wherein said preprocessing comprises performing texture characterization of the image to segment the image, and wherein said extracting invariant shape features of the object is performed based on the segmented image.

15. The method of claim 1, wherein the generalized invariant feature descriptor comprises a generalized invariant feature vector comprising respective components corresponding to the extracted invariant shape features, and wherein said classifying the object based on the extracted invariant shape features comprises: computing a plurality of differences between the generalized invariant feature vector and respective generalized invariant feature vectors corresponding to a plurality of reference objects; determining a minimum difference from the plurality of differences, wherein the minimum difference corresponds to a closest reference object of the plurality of reference objects; and outputting an indication of the closest reference object as a classification of the object.

16. The method of claim 1, wherein the generalized invariant feature descriptor comprises a generalized invariant feature vector comprising respective components corresponding to the extracted invariant shape features, and wherein said classifying the object based on the extracted invariant shape features comprises: computing a plurality of differences between the generalized invariant feature vector and respective generalized invariant feature vectors corresponding to classes of reference objects of a plurality of reference objects, and wherein each respective generalized invariant feature vector comprises an average of generalized invariant feature vectors for a respective one or more reference objects; determining a minimum difference from the plurality of differences, wherein the minimum difference corresponds to a closest class of the classes of reference objects; and outputting an indication of the closest class of reference objects as a classification of the object.

17. The method of claim 1, further comprising: making a decision based on the classification of the object.

18. The method of claim 17, wherein said making a decision based on the classification of the object comprises: setting one or more tolerance thresholds for the classification; determining one or more scores for the classification of the object; comparing at least one of the one or more scores to at least one of the one or more tolerance thresholds; if said comparing indicates that the classification is not valid, rejecting the classification; and if said comparing indicates that the classification is valid, accepting the classification.

19. The method of claim 18, wherein said setting one or more tolerance thresholds, said determining one or more scores, and said comparing comprises:
   setting a classification tolerance threshold; setting an identification tolerance threshold;
   determining a classification score for the classification of the object; comparing the classification score with the classification tolerance threshold;

if said comparing the classification score with the classification tolerance threshold indicates that the classification is not valid, determining an identification score for the classification of the object;

comparing the identification score with the identification tolerance threshold;

if said comparing the identification score with the identification tolerance threshold indicates that the classification is not valid, performing said rejecting the classification; and if said comparing the identification score with the identification tolerance threshold indicates that the classification is valid, performing said accepting the classification; and if said comparing the classification score with the classification tolerance threshold indicates that the classification is valid, performing said accepting the classification.

20. The method of claim 1, wherein the object comprises is a binary large object (BLOB).

21. The method of claim 1, further comprising: extracting one or more non-invariant features of the object; and determining one or more non-invariant feature descriptors for the object based on the extracted one or more non-invariant features of the object.

22. The method of claim 21, wherein said classifying the object based on the extracted invariant shape features comprises: classifying the object based on the extracted invariant shape features and the extracted one or more non-invariant shape features.

23. The method of claim 22, wherein said classifying the object based on the extracted invariant shape features and the extracted non-invariant shape features comprises: computing a shape classifier output based on the extracted invariant shape features; computing one or more respective non-invariant classifier outputs based on the extracted one or more non-invariant features; weighting the shape classifier output, and each of the respective classifier outputs with respective classifier weighting factors, thereby generating a weighted shape classifier output, and one or more respective weighted non-invariant classifier outputs; combining the weighted shape classifier output and the one or more respective weighted non-invariant classifier outputs to generate a classifier output; and classifying the object based on the generated classifier output.

24. The method of claim 23, wherein the one or more non-invariant features of the object comprise one or more of: one or more scale features of the object; and one or more reflection features of the object; wherein said computing one or more respective non-invariant classifier outputs comprises one or more of: computing a scale classifier output based on the extracted one or more scale features; or computing a reflection classifier output based on the extracted one or more reflection features.

25. The method of claim 23 wherein said computing a shape classifier output based on the extracted invariant shape features and said computing one or more respective non-invariant classifier outputs based on the extracted one or more non-invariant features are performed substantially in parallel.

26. The method of claim 23, wherein the generalized invariant feature descriptor comprises a generalized invariant feature vector comprising respective components corresponding to the extracted invariant shape features, and wherein said computing a shape classifier output comprises computing a plurality of distances between the generalized invariant feature vector and respective generalized invariant feature vectors corresponding to a plurality of reference objects; wherein each of the one or more non-invariant feature descriptors comprises a respective non-invariant feature vector comprising at least one component corresponding to at least one of the one or more non-invariant features, and wherein said computing one or more respective non-invariant classifier outputs comprises: for each of the one or more non-invariant feature descriptors: computing a plurality of distances between the non-invariant feature vector and respective non-invariant feature vectors corresponding to the plurality of reference objects;

wherein said combining the weighted shape classifier output and the one or more respective weighted non-invariant classifier outputs to generate a classifier output comprises: averaging respective distances of the weighted shape classifier output and the one or more respective weighted non-invariant classifier outputs corresponding to each of the plurality of reference objects, thereby computing a plurality of weighted average distances corresponding to the plurality of reference objects; and wherein said classifying the object based on the generated classifier output comprises: determining a minimum weighted average distance from the plurality of weighted average distances, wherein the minimum weighted average distance corresponds to a closest reference object of the plurality of reference objects; and outputting an indication of the closest reference object as a classification of the object.

27. The method of claim 26, wherein the distances between the generalized invariant feature vector and respective generalized invariant feature vectors corresponding to a plurality of reference objects each comprises a metric distance; and wherein the distances between the non-invariant feature vector and respective non-invariant feature vectors corresponding to the plurality of reference objects each comprises a respective non-metric distance.

28. The method of claim 23, wherein the generalized invariant feature descriptor comprises a generalized invariant feature vector comprising respective components corresponding to the extracted invariant shape features, wherein said computing a shape classifier output comprises computing a plurality of distances between the generalized invariant feature vector and respective generalized invariant feature vectors corresponding to classes of reference objects of a plurality of reference objects, and wherein each respective generalized invariant feature vector comprises an average of generalized invariant feature vectors for a respective one or more reference objects; wherein each of the one or more non-invariant feature descriptors comprises a respective non-invariant feature vector comprising at least one component corresponding to at least one of the one or more non-invariant features, and wherein said computing one or more respective non-invariant classifier outputs comprises: for each of the one or more non-invariant feature descriptors: computing a plurality of distances between the non-invariant feature vector and respective non-invariant feature vectors corresponding to the classes of reference objects; wherein said combining the weighted shape classifier output and the one or more respective weighted non-invariant classifier outputs to generate a classifier output comprises: averaging respective distances of the weighted shape classifier output and the one or more respective weighted non-invariant classifier outputs corresponding to each of the classes of reference objects, thereby computing a plurality of weighted average distances corresponding to the classes of reference objects; and wherein said classifying the object based on the generated classifier output comprises: determining a minimum weighted average distance from the plurality of weighted average distances, wherein the minimum weighted average distance corresponds to a closest class of the classes of reference objects;

and outputting an indication of the closest class of reference objects as a classification of the object.

29. The method of claim 28, wherein the distances between the generalized invariant feature vector and respective generalized invariant feature vectors corresponding to classes of reference objects each comprises a metric distance; and wherein the distances between the non-invariant feature vector and respective non-invariant feature vectors corresponding to the classes of reference objects each comprises a respective non-metric distance.

30. The method of claim 1, further comprising: determining if the object is to be classified using scale dependent features; and if the object is to be classified using scale dependent features, determining a scale feature of the object.

31. The method of claim 30, wherein the scale feature of the object comprises: an area of the object.

32. The method of claim 1, further comprising: determining if the object is to be classified using reflection dependent features; and if the object is to be classified using reflection dependent features, determining one or more reflection features of the object.

33. The method of claim 32, wherein said determining if the object is to be classified using reflection dependent features comprises: computing a symmetry factor of the object; and determining if the symmetry factor is less than a specified tolerance, wherein the symmetry factor being less than the specified tolerance indicates that object is to be classified using reflection dependent features.

34. The method of claim 33, wherein said determining one or more reflection features of the object comprises:
determining an orientation of the object; determining an orientation of one or more maximum Feret diameters of the object;
determining a difference between the orientation of the object and the orientation of each of the one or more maximum Feret diameters of the object; and
if there is more than one maximum Feret diameter of the object, determining a minimum difference between the orientation of the object and the orientations of the one or more maximum Feret diameters of the object, wherein the one or more reflection features of the object comprises the minimum difference.

35. The method of claim 1, wherein the image comprises a plurality of objects, the method further comprising: performing said extracting invariant shape features and said classifying for each of the plurality of objects.

36. A computer accessible memory medium configured for analyzing an image, wherein the medium is configured to implement:
storing an image, wherein the image is stored in a memory, and wherein the image comprises an object;
extracting, by software executing on the computer, invariant shape features of the object using a generalized invariant feature descriptor, wherein the invariant shape features are features that are invariant with respect to scale, translation, rotation and symmetry, wherein the generalized invariant feature descriptor comprises a generalized invariant feature vector that represents attributes of the object in an invariant feature space defined by components of the generalized invariant feature descriptor, wherein the generalized invariant feature vector specifies a position in the invariant feature space, wherein the generalized invariant feature vector comprises comprising components corresponding to:
roundness of the object;
compactness of the object; holes of the object; and
Hu Moments of the object; and
classifying the object based on the extracted invariant shape features, wherein said classifying comprises comparing the position specified by the generalized invariant feature vector with positions of a plurality of corresponding generalized invariant feature vectors or partitions of the invariant feature space representing respective objects or classes of objects, and wherein said classifying comprises storing information classifying the object in a computer memory.

37. The memory medium of claim 36, wherein the generalized invariant feature descriptor comprises a generalized invariant feature vector comprising respective components corresponding to:
circularity of the object;
elongation of the object;
perimeter-ratio-based convexity of the object;
area-ratio-based convexity of the object;
hole-perimeter-ratio of the object;
hole-area-ratio of the object;
a function of Hu Moment 1 of the object; and
a function of Hu Moment 2 of the object.

38. The memory medium of claim 36, wherein the medium is further configured to implement: extracting one or more non-invariant features of the object; and determining one or more non-invariant feature descriptors for the object based on the extracted one or more non-invariant features of the object.

39. The memory medium of claim 38, wherein said classifying the object based on the extracted invariant shape features comprises: classifying the object based on the extracted invariant shape features and the extracted one or more non-invariant shape features.

40. The memory medium of claim 39, wherein said classifying the object based on the extracted invariant shape features and the extracted non-invariant shape features comprises:
computing a shape classifier output based on the extracted invariant shape features; computing one or more respective non-invariant classifier outputs based on the extracted one or more non-invariant features;
weighting the shape classifier output, and each of the respective classifier outputs with respective classifier weighting factors, thereby generating a weighted shape classifier output, and
one or more respective weighted non-invariant classifier outputs;
combining the weighted shape classifier output and the one or more respective weighted non-invariant classifier outputs to generate a classifier output; and classifying the object based on the generated classifier output.

41. The memory medium of claim 40, wherein the one or more non-invariant features of the object comprise one or more of:
one or more scale features of the object; and one or more reflection features of the object; wherein said computing one or more respective non-invariant classifier outputs comprises one or more of: computing a scale classifier output based on the extracted one or more scale features; or computing a reflection classifier output based on the extracted one or more reflection features.

42. The memory medium of claim 40 wherein said computing a shape classifier output based on the extracted invariant shape features and said computing one or more respective non-invariant classifier outputs based on the extracted one or more non-invariant features are performed substantially in parallel.

43. The memory medium of claim 36, wherein the medium comprises a memory medium.

44. The memory medium of claim 36, wherein the medium comprises a carrier medium.

45. A system for performing object analysis, the system comprising:
- a processor;
- a memory medium coupled to the processor, wherein the memory medium stores an image, wherein the image comprises an object, and wherein the memory medium stores program instructions which are executable by the processor to:
- extract invariant shape features of the object using a generalized invariant feature descriptor, wherein the invariant shape features are features that are invariant with respect to scale, translation, rotation and symmetry, wherein the generalized invariant feature descriptor comprises a generalized invariant feature vector that represents attributes of the object in an invariant feature space defined by components of the generalized invariant feature descriptor, wherein the generalized invariant feature vector specifies a position in the invariant feature space, wherein the generalized invariant feature vector comprises comprising components corresponding to:
- roundness of the object;
- compactness of the object;
- holes of the object; and
- Hu Moments of the object; and classify the object based on the extracted invariant shape features, wherein said classifying comprises comparing the position specified by the generalized invariant feature vector with positions of a plurality of corresponding generalized invariant feature vectors or partitions of the invariant feature space representing respective objects or classes of objects, and wherein said classifying comprises storing information classifying the object in a computer memory.

46. The system of claim 45, wherein the generalized invariant feature descriptor comprises a generalized invariant feature vector comprising respective components corresponding to:
- circularity of the object;
- elongation of the object;
- perimeter-ratio-based convexity of the object;
- area-ratio-based convexity of the object;
- hole-perimeter-ratio of the object;
- hole-area-ratio of the object;
- a function of Hu Moment 1 of the object; and
- a function of Hu Moment 2 of the object.

47. The system of claim 45, further comprising: extracting one or more non-invariant features of the object; and determining one or more non-invariant feature descriptors for the object based on the extracted one or more non-invariant features of the object.

48. A system for analyzing an image, the system comprising:
- means for receiving an image, wherein the image is stored in a memory, and wherein the image comprises an object;
- means for extracting invariant shape features of the object using a generalized invariant feature descriptor, wherein the invariant shape features are features that are invariant with respect to scale, translation, rotation and symmetry, wherein the generalized invariant feature descriptor comprises a generalized invariant feature vector that represents attributes of the object in an invariant feature space defined by components of the generalized invariant feature descriptor, wherein the generalized invariant feature vector specifies a position in the invariant feature space, wherein the generalized invariant feature vector comprises comprising components corresponding to:
- roundness of the object;
- compactness of the object;
- holes of the object;
- and Hu Moments of the object;
- and
- means for classifying the object based on the extracted invariant shape features, wherein said classifying comprises comparing the position specified by the generalized invariant feature vector with positions of a plurality of corresponding generalized invariant feature vectors or partitions of the invariant feature space representing respective objects or classes of objects, and including means for storing information classifying the object in a computer memory.

49. The system of clam 48, wherein the generalized invariant feature descriptor comprises a generalized invariant feature vector comprising respective components corresponding to:
- circularity of the object;
- elongation of the object;
- perimeter-ratio-based convexity of the object;
- area-ratio-based convexity of the object;
- hole-perimeter-ratio of the object; hole-area-ratio of the object;
- a function of Hu Moment 1 of the object; and a function of Hu Moment 2 of the object.

50. The system of claim 48, further comprising: means for extracting one or more non-invariant features of the object; and means for determining one or more non-invariant feature descriptors for the object based on the extracted one or more non-invariant features of the object.

* * * * *

UNITED STATES PATENT AND TRADEMARK OFFICE
CERTIFICATE OF CORRECTION

| | | |
|---|---|---|
| PATENT NO. | : 7,668,376 B2 | Page 1 of 1 |
| APPLICATION NO. | : 11/003187 | |
| DATED | : February 23, 2010 | |
| INVENTOR(S) | : Lin et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1119 days.

Signed and Sealed this

Seventh Day of December, 2010

David J. Kappos
*Director of the United States Patent and Trademark Office*